(12) United States Patent
Bao et al.

(10) Patent No.: US 12,048,048 B2
(45) Date of Patent: Jul. 23, 2024

(54) INACTIVITY TIMER MECHANISMS IN DISCONTINUOUS RECEPTION

(71) Applicant: Qualcomm INCORPORATED, San Diego, CA (US)

(72) Inventors: Jingchao Bao, San Diego, CA (US); Sony Akkarakaran, Poway, CA (US); Alexandros Manolakos, Escondido, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/361,641

(22) Filed: Jun. 29, 2021

(65) Prior Publication Data

US 2022/0007456 A1 Jan. 6, 2022

Related U.S. Application Data

(60) Provisional application No. 63/048,301, filed on Jul. 6, 2020.

(51) Int. Cl.
*H04W 76/28* (2018.01)
*H04W 72/04* (2023.01)
*H04W 76/27* (2018.01)

(52) U.S. Cl.
CPC ........... *H04W 76/28* (2018.02); *H04W 72/04* (2013.01); *H04W 76/27* (2018.02)

(58) Field of Classification Search
None
See application file for complete search history.

(56) References Cited

U.S. PATENT DOCUMENTS

2002/0172178 A1* 11/2002 Suzuki ................. H04W 76/38
370/328
2009/0232054 A1 9/2009 Wang et al.
2011/0002281 A1* 1/2011 Terry ................... H04W 76/28
370/329

(Continued)

FOREIGN PATENT DOCUMENTS

WO 2014109769 A1 7/2014

OTHER PUBLICATIONS

International Search Report and Written Opinion—PCT/US2021/039743—ISA/EPO—Oct. 26, 2021.

(Continued)

*Primary Examiner* — Jamaal Henson
(74) *Attorney, Agent, or Firm* — Thien T. Nguyen

(57) ABSTRACT

Techniques are provided for operating user equipment (UE) in a discontinuous reception (DRX) mode, and more specifically, setting a DRX inactivity timer value. An example method for operating a user equipment in a discontinuous reception mode including an active mode for communicating with a network and an inactive mode when the user equipment does not communicate with the network includes determining a trigger condition based on a communication with the network, determining the inactivity timer value based on the trigger condition, and operating the user equipment in the active mode during a duration of the inactivity timer value and in the inactive mode after the duration of the inactivity timer value.

4 Claims, 14 Drawing Sheets

(56) References Cited

U.S. PATENT DOCUMENTS

| | | | | |
|---|---|---|---|---|
| 2011/0199910 A1* | 8/2011 | Oh | H04W 52/0229 | 370/241 |
| 2011/0310997 A1* | 12/2011 | Ke | H04W 76/28 | 375/316 |
| 2012/0122405 A1* | 5/2012 | Gerber | H04W 52/0232 | 455/67.11 |
| 2012/0176957 A1* | 7/2012 | Chen | H04B 7/155 | 370/315 |
| 2013/0121220 A1* | 5/2013 | Virtej | H04W 52/0241 | 370/311 |
| 2013/0294307 A1* | 11/2013 | Johansson | H04W 76/28 | 370/311 |
| 2014/0019743 A1* | 1/2014 | DeLuca | G06F 1/3206 | 713/100 |
| 2014/0064134 A1* | 3/2014 | Huang | H04W 76/38 | 370/253 |
| 2014/0211676 A1* | 7/2014 | Chhabra | H04W 76/38 | 370/311 |
| 2015/0173013 A1* | 6/2015 | Iwai | H04W 52/0232 | 455/418 |
| 2015/0327167 A1* | 11/2015 | Ljung | H04W 76/28 | 370/311 |
| 2015/0351151 A1* | 12/2015 | Huang | H04W 24/08 | 370/252 |
| 2015/0365963 A1* | 12/2015 | Won | H04W 4/06 | 370/329 |
| 2016/0286601 A1* | 9/2016 | Siomina | H04W 76/28 | |
| 2017/0202054 A1 | 7/2017 | Rathonyi et al. | | |
| 2018/0220366 A1* | 8/2018 | Bergström | H04W 76/28 | |
| 2018/0242197 A1* | 8/2018 | Iwai | H04W 76/20 | |
| 2020/0137822 A1* | 4/2020 | Lee | H04W 76/28 | |

OTHER PUBLICATIONS

NTT Docomo, et al., "Inactivity Timer Disablement", 3GPP Draft, 3GPP TSG RAN WG2 #60bis, R2-080432, 3rd Generation Partnership Project (3GPP), Mobile Competence Centre, 650, Route Des Lucioles, F-06921 Sophia-Antipolis Cedex, France, vol. RAN WG2, No. Sevilla, Spain, Jan. 22, 2008, Jan. 22, 2008 (Jan. 22, 2008), XP050138282, 2 Pages, [Retrieved on Jan. 22, 2008], p. 2.

* cited by examiner

Figure 11:
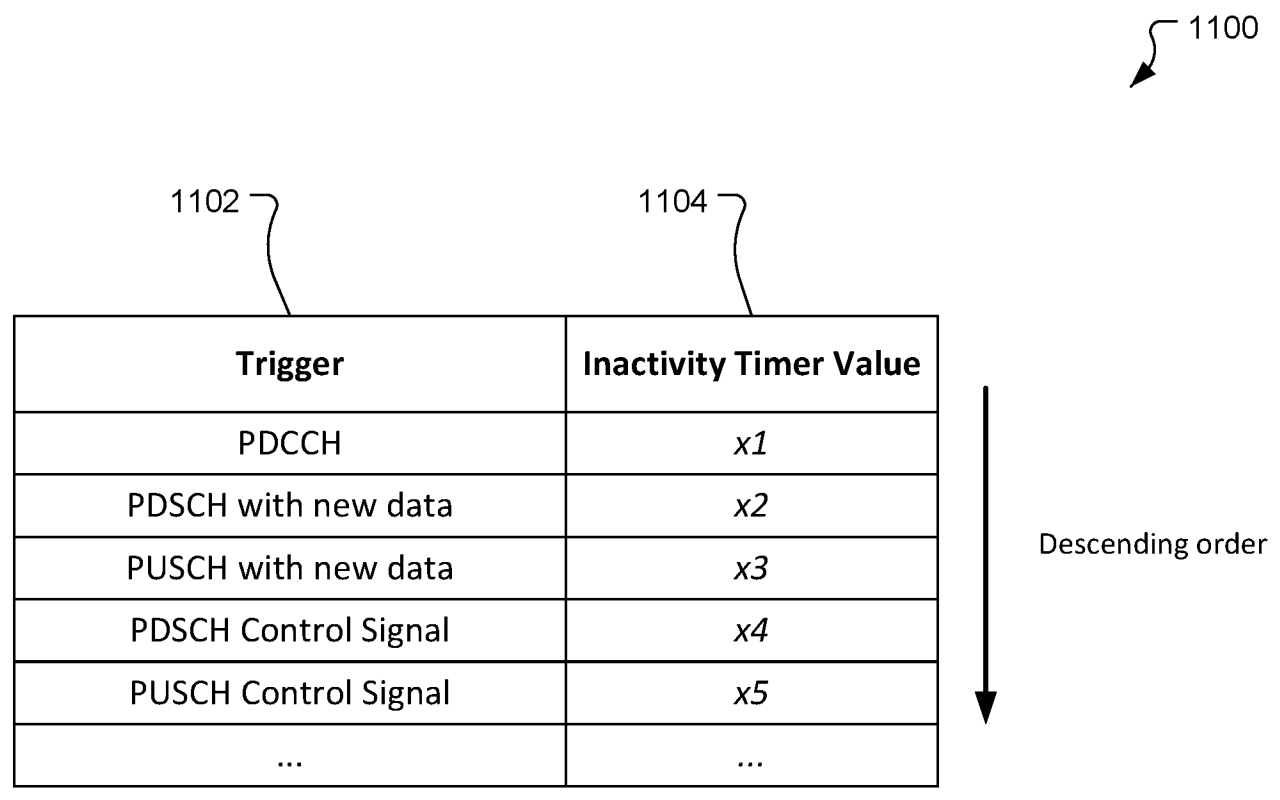

| Trigger | Inactivity Timer Value |
|---|---|
| PDCCH | x1 |
| PDSCH with new data | x2 |
| PUSCH with new data | x3 |
| PDSCH Control Signal | x4 |
| PUSCH Control Signal | x5 |
| ... | ... |

Descending order →

| Report config / PRS config | Periodic positioning report | Semipersistent positioning report | Asynchronous postioning report |
|---|---|---|---|
| Periodic DL-PRS | No dynamic trigger/activation. Report could be on PUCCH (L1) and/or PUSCH (L1/L2) | DCI triggered: report on PUSCH (L1/L2). MAC-CE activation: report on PUCCH (L1) and/or PUSCH (L1/L2) | DCI triggered: report on PUSCH (L1/L2) |
| SP DL-PRS | NA | DCI triggered: report on PUSCH (L1/L2). MAC-CE activation: report on PUCCH (L1) and/or PUSCH (L1/L2) | DCI triggered: report on PUSCH (L1/L2) |
| A DL-PRS | NA | NA | DCI triggered: report on PUSCH (L1/L2) |

FIG. 12

INACTIVITY TIMER MECHANISMS IN DISCONTINUOUS RECEPTION

CROSS-REFERENCE TO RELATED APPLICATION

This application claims the benefit of U.S. Provisional Application No. 63/048,301, filed Jul. 6, 2020, entitled "INACTIVITY TIMER MECHANISMS IN DISCONTINUOUS RECEPTION," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards. Signaling efficiencies and data processing improvements within network devices and user equipment may be realized to improve bandwidth and conserve power in mobile user equipment.

SUMMARY

An example method of configuring a discontinuous reception (DRX) mode in a mobile device according to the disclosure includes evaluating a communication with a network, and setting an inactivity timer duration based on the communication with the network.

Implementations of such a network may include one or more of the following features. The communication with the network may be received via a Physical Downlink Control Channel (PDCCH). The communication with the network may be received via a Physical Downlink Shared Channel (PDSCH). The communication with the network may be a Medium Access Control Control Element (MAC-CE) message. The communication with the network may be transmitted via a Physical Uplink Shared Channel (PUSCH). The communication with the network may be a Medium Access Control Control Element (MAC-CE) message. The MAC-CE message may include an uplink grant request. The method may further include evaluating a second communication with the network, such that the second communication occurs during the inactivity timer duration, and setting the inactivity timer duration based on the second communication with the network.

An example method for operating a user equipment in a discontinuous reception (DRX) mode according to the disclosure includes operating the user equipment in the discontinuous reception (DRX) mode including a DRX active mode for monitoring a network channel and a DRX inactive mode when the user equipment does not monitor the network channel, determining a trigger condition based on a communication with a network, determining an inactivity timer value based on the trigger condition, and operating the user equipment in the DRX active mode during a duration of the inactivity timer value and in the DRX inactive mode after the duration of the inactivity timer value.

Implementations of such a method may include one or more of the following features. The communication with the network may be received via a Physical Downlink Control Channel (PDCCH) and the inactivity timer value may be a non-zero value (e.g., in a range from 1 to 2560 milliseconds). The communication with the network may be received via a Physical Downlink Shared Channel (PDSCH) and the inactivity timer value may be a non-zero value. The communication with the network may comprise a Medium Access Control Control Element (MAC-CE) message and the inactivity timer value may be any value including zero (e.g., in a range from 0 to 2560 milliseconds). The communication with the network may include only a MAC-CE message (e.g., MAC-CE only). The communication with the network may be transmitted via a Physical Uplink Shared Channel (PUSCH) and the inactivity timer value may be in a non-zero value. The communication with the network may be a Medium Access Control Control Element (MAC-CE) message and the inactivity timer value may be an value including zero. The MAC-CE message may include an uplink grant request and the inactivity timer value may be a non-zero value. Determining the inactivity timer value may be based on the trigger condition includes querying a data structure based on the trigger condition. The method may further include communicating with the network during the duration of the inactivity timer value, determining a second trigger condition based on the communication during the duration of the inactivity timer value, and modifying the inactivity timer value based on the second trigger condition.

An example method for operating a user equipment in a discontinuous reception (DRX) mode according to the disclosure includes operating the user equipment in the discontinuous reception (DRX) mode comprising a DRX active mode for monitoring a network channel and a DRX inactive mode when the user equipment does not monitor the network channel, wherein the DRX active mode includes an inactivity timer duration, communicating with the network during the inactivity timer duration, determining a trigger condition based on a communication during the inactivity timer duration, determining an inactivity timer fallback value based on the trigger condition, and operating the user equipment in the DRX active mode or the DRX inactive mode based on the inactivity timer fallback value.

Implementations of such a method may include one or more of the following features. The communication with the network may be received via a Physical Downlink Control Channel (PDCCH). The communication with the network may be received via a Physical Downlink Shared Channel (PDSCH). The communication with the network may be a Medium Access Control Control Element (MAC-CE) message. The communication with the network may be transmitted via a Physical Uplink Shared Channel (PUSCH). The communication with the network may be a Medium Access Control Control Element (MAC-CE) message. The MAC-CE message may include an uplink grant request. Determining the inactivity timer fallback value based on the trigger condition may include querying a data structure based on the trigger condition.

An example apparatus configured for operating in a discontinuous reception (DRX) mode according to the disclosure includes a memory, at least one transceiver, at least one processor communicatively coupled to the memory and the at least one transceiver and configured to evaluate a communication with a network, and set an inactivity timer duration based on the communication with the network.

An example apparatus according to the disclosure includes a memory, at least one transceiver, at least one processor communicatively coupled to the memory and the at least one transceiver and configured to operate the apparatus in a discontinuous reception (DRX) mode including a DRX active mode for monitoring a network channel and a DRX inactive mode when the apparatus does not monitor the network channel, determine a trigger condition based on a communication with a network, determine an inactivity timer value based on the trigger condition, and operate the apparatus in the DRX active mode during a duration of the inactivity timer value and in the DRX inactive mode after the duration of the inactivity timer value.

An example apparatus according to the disclosure includes a memory, at least one transceiver, at least one processor communicatively coupled to the memory and the at least one transceiver and configured to operate the apparatus in a discontinuous reception (DRX) mode including a DRX active mode for communicating with a network and a DRX inactive mode when the apparatus does not communicate with the network, wherein the DRX active mode includes an inactivity timer duration, communicate with the network during the inactivity timer duration, determine a trigger condition based on a communication during the inactivity timer duration, determine an inactivity timer fallback value based on the trigger condition, and operate the apparatus in the DRX active mode or the DRX inactive mode based on the inactivity timer fallback value.

An example apparatus according to the disclosure includes means for evaluating a communication with a network, and means for setting an inactivity timer duration based on the communication with the network.

An example apparatus for operating in a discontinuous reception (DRX) according to the disclosure includes means for operating a user equipment in the discontinuous reception (DRX) mode including a DRX active mode for monitoring a network channel and a DRX inactive mode when the user equipment does not monitor the network channel, means for determining a trigger condition based on a communication with a network, means for determining an inactivity timer value based on the trigger condition, and means for operating the apparatus in the DRX active mode during a duration of the inactivity timer value and in the DRX inactive mode after the duration of the inactivity timer value.

An example apparatus for operating a in a discontinuous reception (DRX) mode according to the disclosure includes means for operating the user equipment in the discontinuous reception (DRX) mode comprising a DRX active mode for monitoring a network channel and a DRX inactive mode when the user equipment does not monitor the network channel, wherein the DRX active mode includes an inactivity timer duration, means for communicating with the network during the inactivity timer duration, means for determining a trigger condition based on a communication during the inactivity timer duration, means for determining an inactivity timer fallback value based on the trigger condition, and means for operating the apparatus in the DRX active mode or the DRX inactive mode based on the inactivity timer fallback value.

An example non-transitory processor-readable storage medium comprising processor-readable instructions configured to cause one or more processors to configure a discontinuous reception (DRX) mode in a mobile device, according to the disclosure includes code for evaluating a communication with a network, and code for setting an inactivity timer duration based on the communication with the network.

An example non-transitory processor-readable storage medium comprising processor-readable instructions configured to cause one or more processors operate a user equipment in a discontinuous reception (DRX) mode according to the disclosure includes code for operating the user equipment in the discontinuous reception (DRX) mode including a DRX active mode for monitoring a network channel and a DRX inactive mode when the user equipment does not monitor the network channel, code for determining a trigger condition based on a communication with a network, code for determining an inactivity timer value based on the trigger condition, and code for operating the user equipment in the DRX active mode during a duration of the inactivity timer value and in the DRX inactive mode after the duration of the inactivity timer value.

An example non-transitory processor-readable storage medium comprising processor-readable instructions configured to cause one or more processors to operate a user equipment in a discontinuous reception (DRX) mode according to the disclosure includes code for operating the user equipment in the discontinuous reception (DRX) mode comprising a DRX active mode for monitoring a network channel and a DRX inactive mode when the user equipment does not monitor the network channel, wherein the DRX active mode includes an inactivity timer duration, code for communicating with the network during the inactivity timer duration, code for determining a trigger condition based on a communication during the inactivity timer duration, code for determining an inactivity timer fallback value based on the trigger condition, and code for operating the user equipment in the DRX active mode or the DRX inactive mode based on the inactivity timer fallback value.

Items and/or techniques described herein may provide one or more of the following capabilities, as well as other capabilities not mentioned. User equipment may be configured to operate in a discontinuous reception mode including alternating periods of active and inactive modes. In the active mode, the user equipment may monitor and communicate with the network. In the inactive mode, the user equipment does not monitor the network. The active mode includes an inactivity timer to indicate a time interval during which the user equipment remains active after a communication with the network. Communications with the network may be used as trigger conditions. The trigger conditions may be a function of the communications traffic type. The inactivity timer duration may be based on the trigger condition. Inactivity timer fallback values may be applied based on communications during the inactivity timer period. The duration of the inactivity timer may be reduced to conserve

BRIEF DESCRIPTION OF THE DRAWINGS

FIG. 11 is an example data structure for trigger based inactivity timer values in a discontinuous reception cycle.

FIG. 12 is a table of example downlink and uplink trigger conditions in a discontinuous reception cycle.

DETAILED DESCRIPTION

Figure 1:
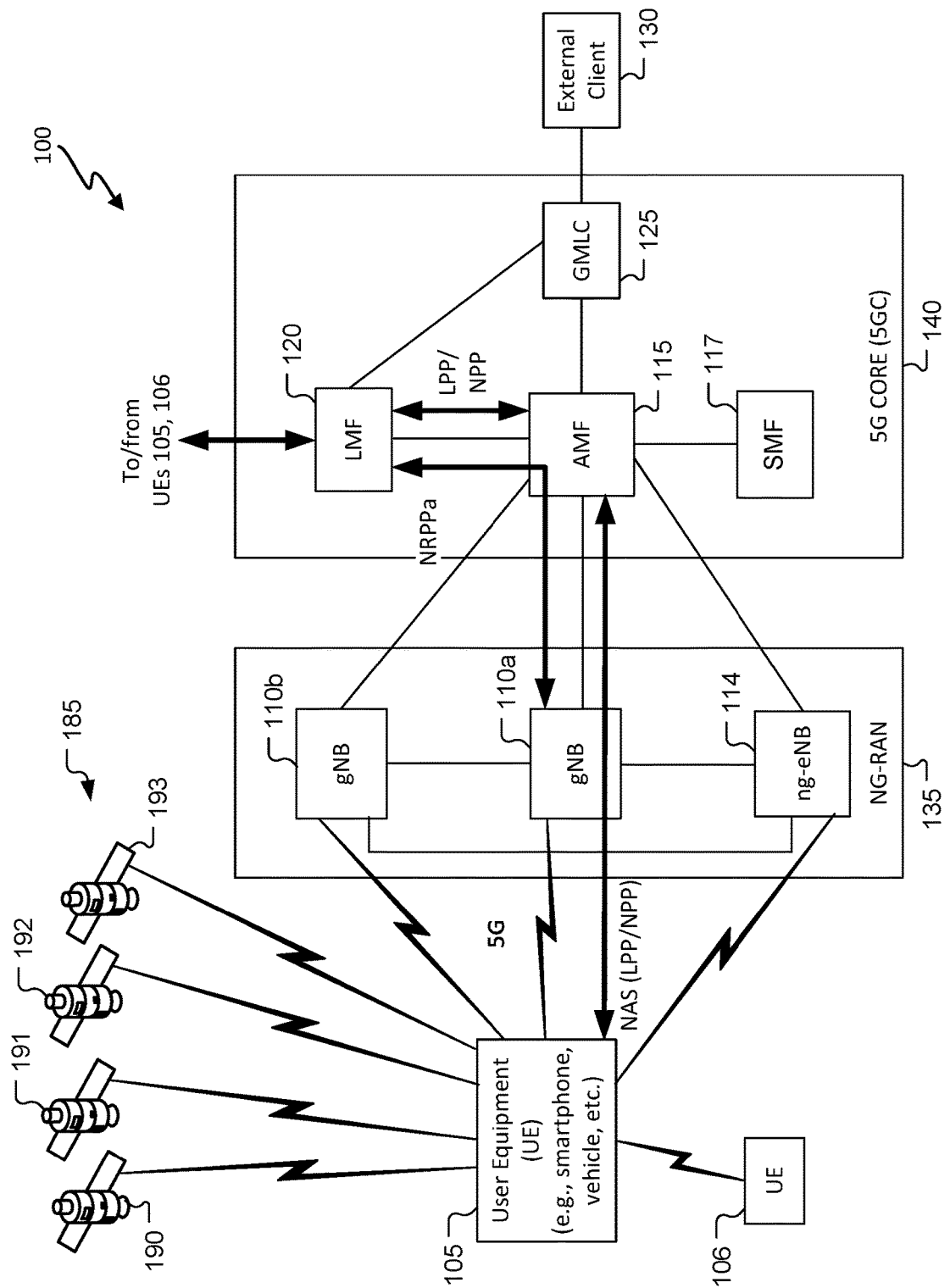
FIG. 1 is a simplified diagram of an example wireless communications system.

Techniques are discussed herein for operating user equipment (UE) in a discontinuous reception (DRX) mode, and more specifically, setting a DRX inactivity timer value. In DRX and similar power saving modes, a UE may monitor a Physical Downlink Control CHannel (PDCCH) while in a Radio Resource Control (RRC) connected state. In general, DRX is a mechanism in which a UE operates intermittently in DRX active and DRX inactive modes. The UE may enter the DRX inactive mode from the DRX active mode and stay in the DRX inactive mode for a predetermined amount of time, although the time in the DRX inactive mode may be altered, e.g., before entering the DRX inactive mode or while in the DRX inactive mode. In "normal," non-DRX operation, the UE is in the active mode at all times and monitors a PDCCH for every subframe or slot or monitoring instance as the UE is unaware of when the network will transmit data (i.e., a control signal on the PDCCH) for the UE. This non-DRX operation may consume more power than is desired and, for example, cause the UE to require charging more than desired or lack power to run one or more desired functions.

When DRX is configured, the UE is not required to continuously monitor the PDCCH. The DRX mechanism may be configured by information elements received from a network (e.g., RRC signaling). The DRX parameters may include an on-duration indicating a time interval during which the UE expects to receive the PDCCH. If the UE successfully decodes the PDCCH, the UE may start an inactivity timer. The inactivity timer indicates a time interval during which the UE waits for successful decoding of the PDCCH, starting from the last successful decoding of the PDCCH. If the decoding fails, the UE may go into to a DRX inactive mode where the PDCCH is not monitored. The UE may start the inactivity timer following a single successful decoding of a PDCCH for the first transmission (i.e., not for retransmissions). A retransmission timer indicates a time interval until a retransmission can be expected. A cycle parameter indicates the periodic repetition of the on-duration followed by a possible period of inactivity.

Cellular network packet traffic, and 5G NR in particular, may be bursty in nature such that intermittent periods of transmission activity may be followed by longer periods of inactivity. 5G NR supports a DRX scheme to reduce the power consumed by the UE. When a DRX cycle is configured, the UE monitors the PDCCH during the DRX active time and may not monitor the PDCCH during the DRX inactive time. Since decoding the PDCCH requires significant power, the longer the DRX inactive time, the lower the power consumption.

The methods and techniques described herein increase the DRX inactive time by selectively limiting the length of the inactivity timer. Specifically, since the inactivity timer indicates the time interval during which the UE waits to receive or transmit a burst of traffic. For example, for downlink traffic, the inactivity timer is the interval the UE waits for successful decoding of an active signal, starting from the last successful decoding of the active signal, the nature of the last successful decoded signal may be a trigger condition indicating a length of the inactivity timer. For example, an inactivity timer value may be a first value if the trigger condition is a signal on the PDCCH. The inactivity timer value may be a second value if the trigger condition is a signal on the Physical Downlink Shared Channel (PDSCH), In another example, the inactivity timer may be based on the interval during which the UE transmits a continuous burst of traffic. For example, a third value of the trigger condition is an uplink signal on the Physical Uplink Shared Channel (PUSCH). If a trigger condition is associated with a control message (e.g., Medium Access Control Control Element (MAC-CE), or higher layer control messages), then the inactivity timer may be a fourth value, or a zero value (i.e., have no duration). The trigger conditions may be applied to signals sent or received during the inactivity timer period. For example, the UE may start an inactivity timer at a first time and then pause or fallback to a previous timer setup when a second trigger condition is satisfied. Other configurations, however, may be used.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110*a*, 110*b*, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/ system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and provides QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
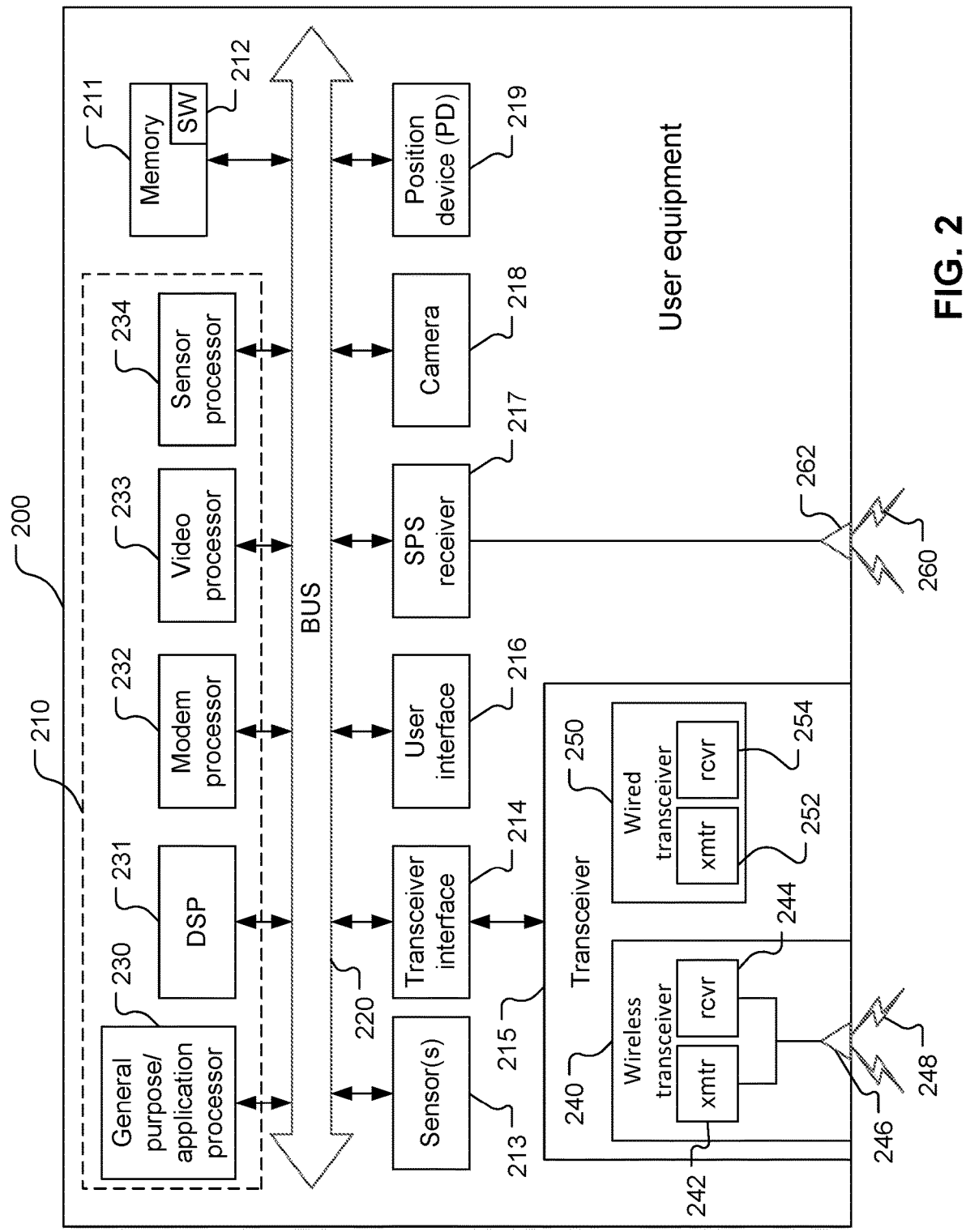
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes. The sensor(s) 213 may include one or more magnetometers to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 262, and/or another component of the UE 200, and may be provided by hardware, software, firmware, or various combinations thereof.

Figure 3:
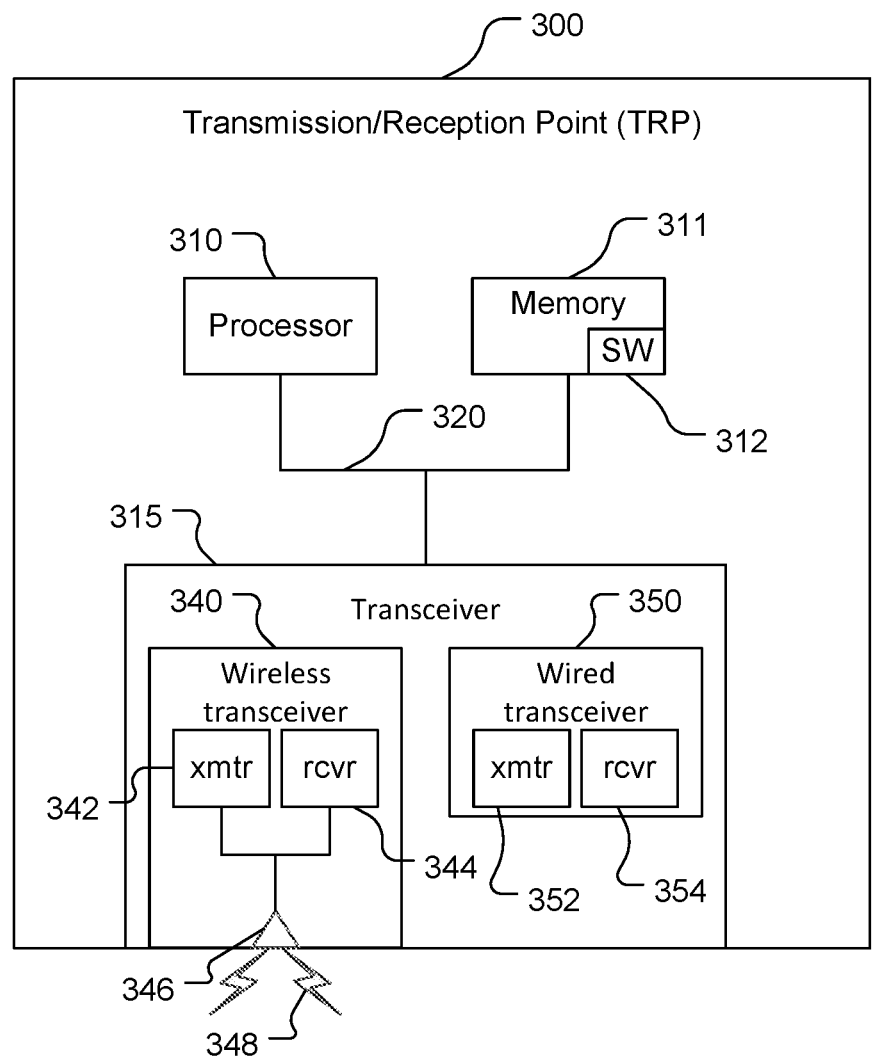
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 135 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
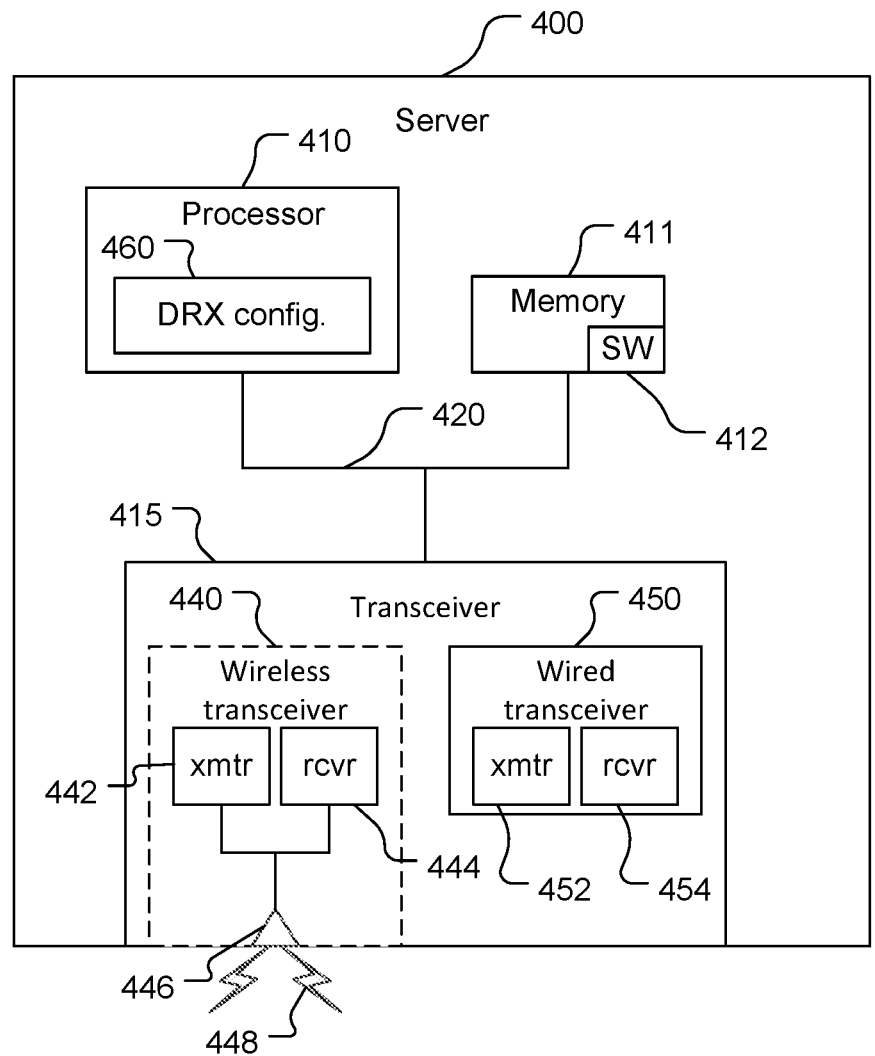
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The processor 410 (possibly in conjunction with the memory 411 and, as appropriate, (one or more portions of) the transceiver 415) includes a DRX configuration unit 460. The DRX configuration unit 460 may be configured to determine and/or provide configuration information to configure measurement behavior of a UE based on DL-PRS relative to DRX ON time and/or to configure positioning information reporting by the UE based on timing of a positioning information report (e.g., a PRS report) relative to DRX ON time. Functionality of the DRX configuration unit 460 is discussed further below, and the description may refer to the processor 410 generally, or the server 400 generally, as performing any of the functions of the DRX configuration unit 460

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
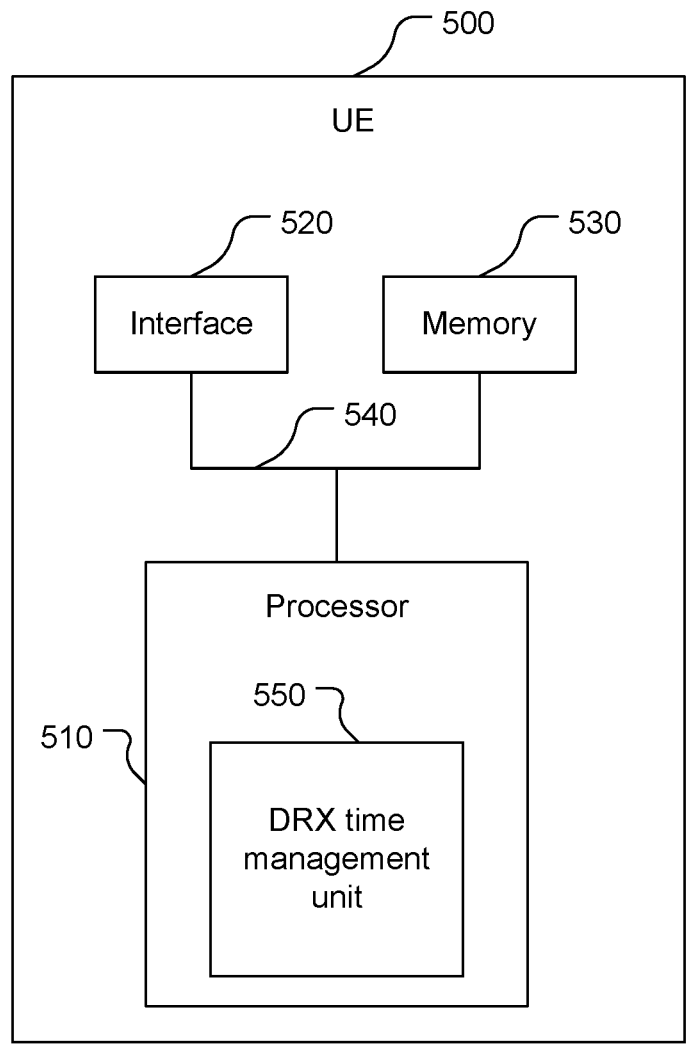
FIG. 5 is a simplified block diagram of an example of the user equipment shown in FIG. 2.

Referring to FIG. 5, with further reference to FIGS. 1-4, a UE 500, which is an example of the UE 200 shown in FIG. 2, includes a processor 510, an interface 520, and a memory 530 communicatively coupled to each other by a bus 540. The UE 500 may include the components shown in FIG. 5, and may include one or more other components such as any of those shown in FIG. 2. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions. The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a DRX time management unit 550 configured to receive DRX configuration information from the TRP 300 (e.g., a serving TRP) and to use the received DRX configuration information to implement DRX. The DRX configuration information may include, for example, the DRX cycle, DRX ON duration timer, DRX inactivity timer, DRX retransmission timer, short DRX cycle, and DRX short cycle timer. The DRX time management unit 550 may use the configuration information to control DRX ON times and DRX OFF times.

In an example, the DRX time management unit 550 may be configured to select an inactivity timer start/reset mechanism and/or a timer duration value based on the trigger conditions and fallback designs described herein.

Figure 6:
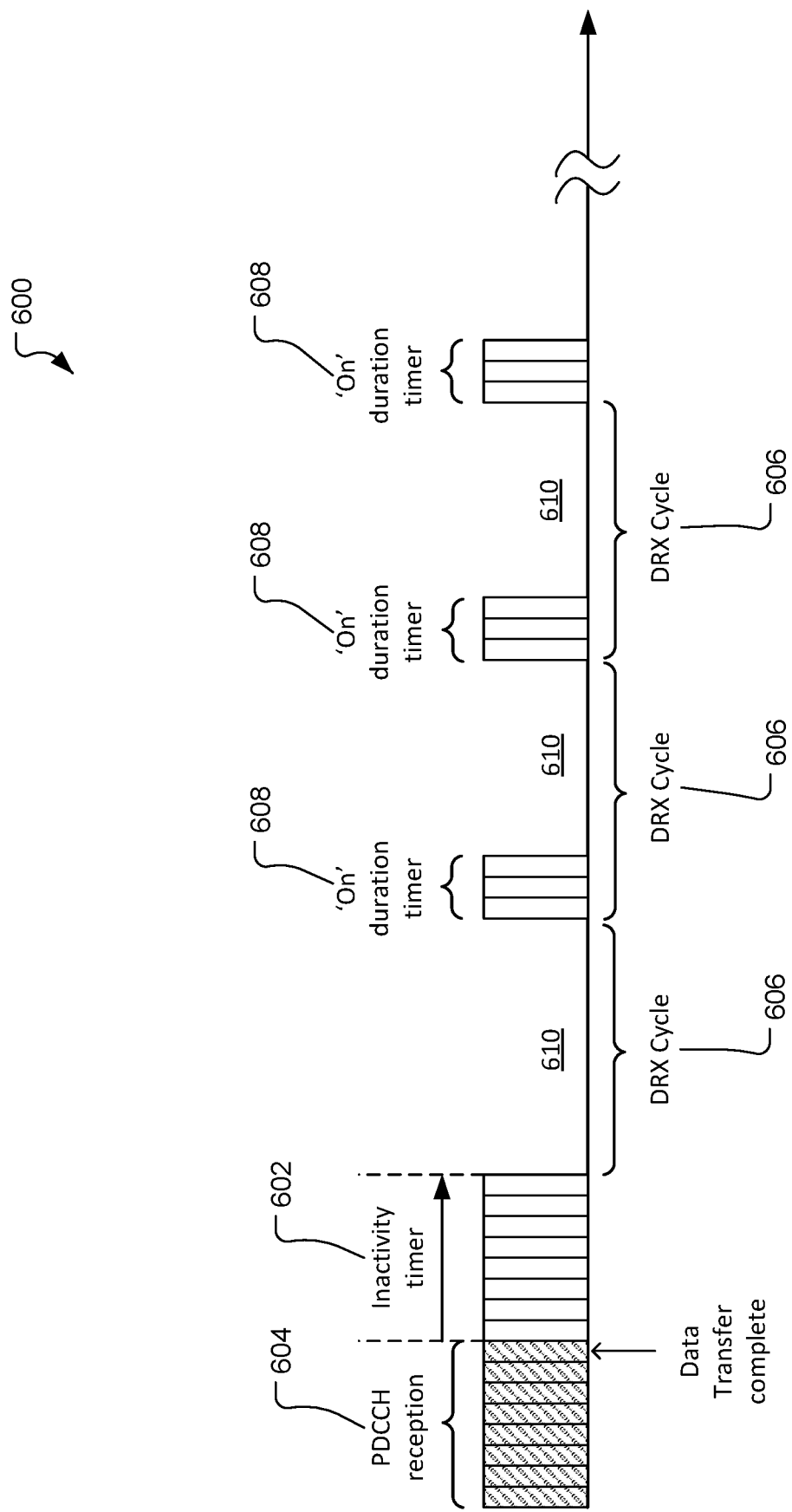
FIG. 6 is an example timing diagram of an inactivity timer in a discontinuous reception cycle.

Referring to FIG. 6, an example timing diagram 600 of an inactivity timer in a discontinuous reception cycle is shown. The timing diagram 600 represents general concepts of a connected mode DRX scheme. One or more information elements in a configuration object may be received by the UE 500 and the DRX time management unit 550 may be configured to operate the connected mode DRX. An inactivity timer value 602 may be an information element and may be started/re-started after a PDCCH reception 604. Assuming the inactivity timer 602 expires, there may be periods of DRX cycles 606 including alternating active periods 608 and inactive periods 610. The duration of the DRX cycles 606 may be configurable. For example, short DRX cycles may be used initially after the PDCCH reception 604 is complete because the probability of further activity may be greater during a time window immediately after an activity. The probability may decrease as the period of inactivity increases and the inactive periods 610 of DRX cycles 606 may also increase in duration. The duration of the inactivity timer 602 is configurable and may be in the range of 1, 10, 20, 10, 50, 2560 milliseconds, as examples. Since the UE 500 and the corresponding receive chain is active for the duration of the inactivity timer 602, and the processor 510 must perform blind decoding of the PDCCH, the UE 500 may be wasting power each time the inactivity timer 602 is set to an unnecessarily long duration. The expiration of the inactivity timer 602 is a condition to enable the UE 500 to enter a DRX inactive mode corresponding to the inactive periods 610. That is, UE 500 may enter a DRX inactive mode when the inactivity timer 602 expires and no other active timers are running (e.g., the DRX ON duration timer, the DRX retransmission timer, etc.). If other timers are running, the UE 500 may remain in the active mode after the inactivity timer 602 expires.

Figure 7:
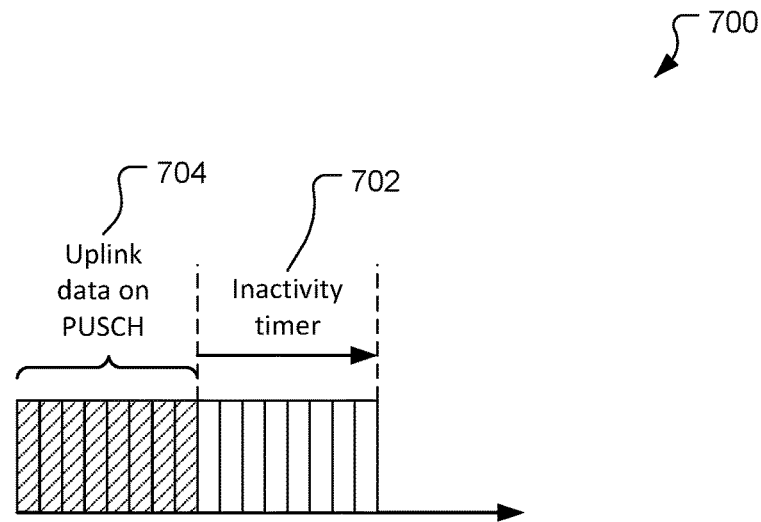
FIG. 7 is an example timing diagram of an inactivity timer after an uplink communication during a discontinuous reception cycle.

Referring to FIG. 7, an example timing diagram 700 of an inactivity timer after an uplink communication during a discontinuous reception cycle is shown. In an example, an inactivity timer 702 may be implemented after a transmitting period 704. For example, the transmitting period 704 may include transmitting uplink data on the PUSCH. The duration of the inactivity timer 702 may also be configurable and may be in the range of 1, 10, 20, 10, 50, 2560 milliseconds, as examples. As depicted in FIGS. 6 and 7, an inactivity timer may be utilized after uplink and downlink periods, and thus the inefficiencies associated with a prolonged inactivity timer duration may occur with both activities.

Figure 8:
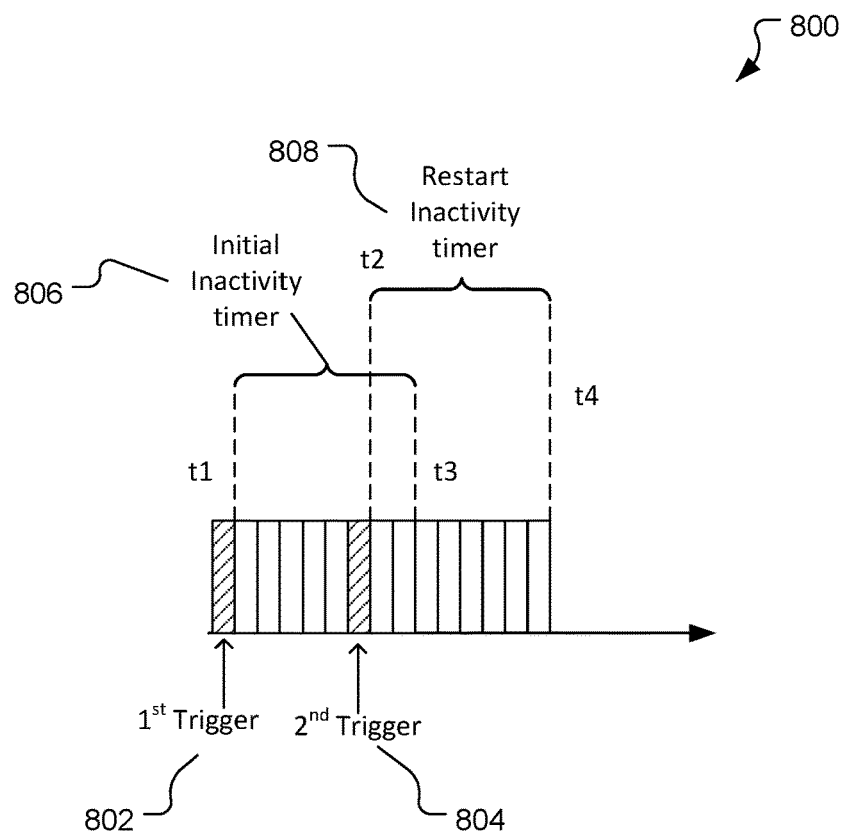
FIG. 8 is an example timing diagram of a restart of an inactivity timer after a communication during an inactivity timer duration of a discontinuous reception cycle.

Referring to FIG. 8, with further reference to FIGS. 6 and 7, an example timing diagram 800 of a restart of an inactivity timer after a communication during an inactivity timer duration of a discontinuous reception cycle is shown. The timing diagram 800 includes two example trigger points such as a first trigger 802 and a second trigger 804. In an example, the first trigger 802 may be the completion of a PDCCH communication at time t1, which initiates an initial inactivity timer 806. The initial inactivity timer 806 may be configured to extend through the duration of time t1 to time t3 as depicted in the diagram 800. The second trigger 804 may be detected at an intervening time t2. For example, the second trigger 804 may be a reception of a new MAC-CE on the PDSCH. Upon detection of the second trigger 804, the DRX time management unit 550 may be configured to restart the inactivity timer 808 beginning at time t2. The duration of the restarted inactivity timer 808 may be the same as the duration of the initial inactivity timer 806 (i.e., t3−t1=t4−t2). As a result of the restart, the duration of the inactivity timer may be unnecessarily extended from time t3 to t4.

Figure 9:
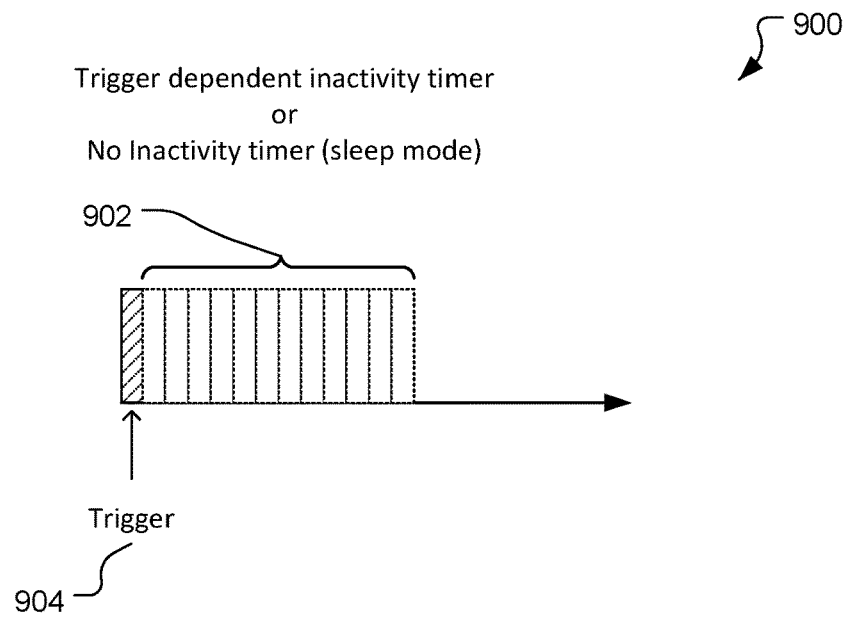
FIG. 9 is an example timing diagram of a trigger based inactivity timer in a discontinuous reception cycle.

Referring to FIG. 9, an example timing diagram 900 of a trigger based inactivity timer in a discontinuous reception cycle is shown. In an embodiment, the DRX time management unit 550 may be configured to select a duration of an inactivity timer 902 based on a trigger 904. The trigger 904 may be categorized based on the traffic associated with uplink and downlink communications. The trigger 904 may be a layer 1 communication such as Downlink Control Information (DCI) on the PDCCH, a layer 2 communication such as a MAC-CE on the PDSCH, or layer 3 communication such as RRC or higher layer control messages. In an example, the PDSCH may carry one or more MAC-Packet Data Units (MAC-PDUs), each of which may be a MAC-subPDU which may be a MAC-CE or MAC-Service Data Unit (MAC-SDU). In operation, the trigger 904 may be the reception of PDCCH with new scheduled downlink and/or uplink data transmissions, and the inactivity timer 902 may be set to a standard value (e.g., a preconfigured value based on received DRX configuration information elements). The DRX time management unit 550 may be configured to modify the duration of the inactivity timer 902 when the trigger 904 is associated with relevant exceptions. For example, when a new DL transmission contains MAC-CE, or an UL transmission contains MAC-CE or a higher layer control message, the resulting duration of the inactivity timer 902 may be set to a lower value, or a zero value (i.e., the UE may go into a DRX inactive mode after the trigger 904). In general, a MAC-CE does not include payload information and it is likely that no additional communications will be transmitted or received by the UE. Thus, the duration of the inactivity timer 902 may be set to zero or some nominal value (e.g., less than 5 msec). An exception to this general rule, however, may be if a particular MAC-CE is associated with additional data transmissions. In an example, a MAC-CE or other higher layer control message may include an explicit indication of the expected additional payload.

A reception on the PDSCH may be the trigger 904, and the DRX time management unit 550 may be configured to set an inactivity timer 902 based on the reception on the PDSCH. Exceptions may also be made for triggers 904 that are associated with single burst transmissions such as when a new DL communication is a MAC-PDU and it contains one or more MAC-CEs or one or more MAC-SDUs, each of which may contain a control message (level 3) or a report message. The DRX time management unit 550 may be configured to determine different starting points for the inactivity timer 902. For example, the starting point may be based on the first symbol, last symbol, or the first symbol after the of PDSCH, and the first symbol, last symbol, or the first symbol after the of ACK of the PDSCH which carries the MAC-CE, or combinations therein.

In an example, the trigger 904 may be a transmission on the PUSCH and the DRX time management unit 550 may be configured to set the inactivity timer 902 based on the transmission of the PUSCH. Exceptions may also be made for burst type transmissions, such as when a new UL messages is a MAC-PDU and contains a MAC-CE, or high layer message. In an example, the PUSCH may carry one or more MAC-PDUs, each of which may be a MAC-subPDU which may be a MAC-CE or MAC-SDU. The DRX time management unit 550 may be configured to set the duration of the inactivity timer 902 to zero, or a level that is less than the inactivity timer value associated with a transmission on the PUSCH. Such an exception, however, may not be appropriate if the MAC-CE contains an UL grant request or a buffer status report (BSR). In this case, the DRX time management unit 550 may be configured to treat the UL grant request as a general new UL transmission and set the inactivity timer 902 to a non-zero overflow/reset value (e.g., 1-2560 msec).

In an embodiment, the PDCCH may schedule multiple downlink and uplink transmissions (e.g., up to 8). In this example, each transmission may be evaluated as a trigger 904 and the described exceptions may be applied on a transmission-by-transmission basis. Thus, the inactivity timer 902 may be a different value for each of the scheduled downlink and uplink transmissions.

Figure 10:
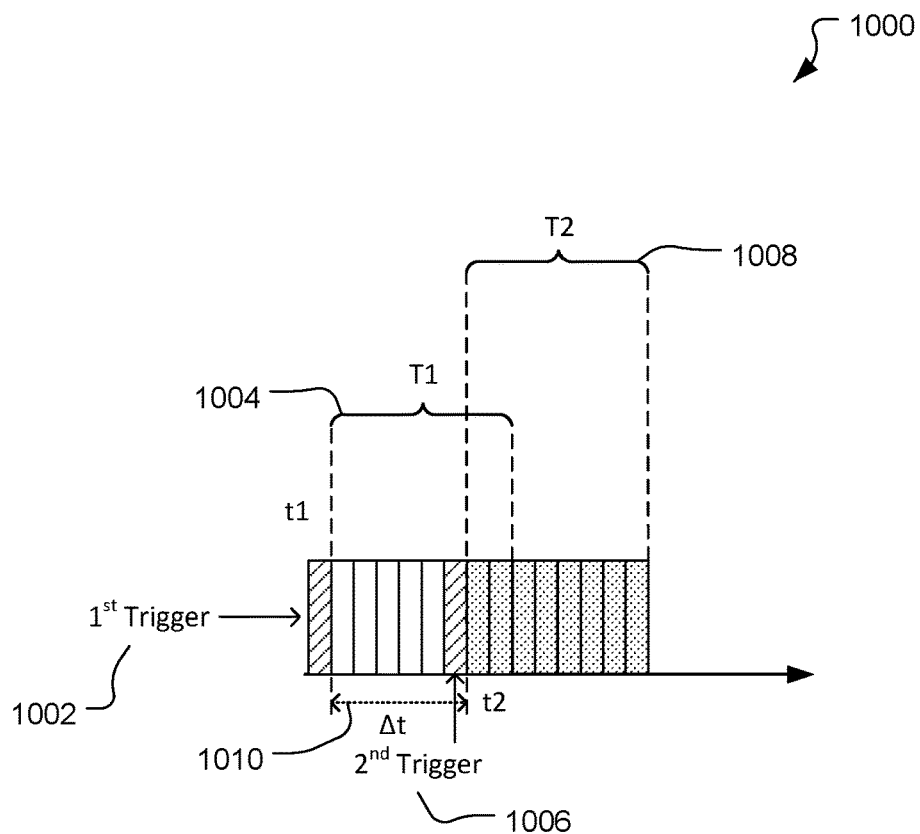
FIG. 10 is an example timing diagram of a trigger based inactivity timer fallback value in a discontinuous reception cycle.

Referring to FIG. 10, an example timing diagram 1000 of a trigger based inactivity timer fallback value in a discontinuous reception cycle is shown. The timing diagram 1000 includes a first trigger 1002 and a first inactivity timer 1004. The duration of the first inactivity timer 1004 may be based on the nature of the first trigger 1002, such as described in FIG. 9. A second trigger 1006 occurs within the duration of the first inactivity timer 1004. For example, the first trigger 1002 may be a reception of the PDCCH with a new scheduled downlink or uplink data transmission at time t1. The DRX time management unit 550 is configured to utilize the first inactivity timer 1004, which has a duration of T1. The second trigger 1006 may be based, for example, on a new downlink PDCCH, a new downlink MAC-CE on the PDSCH, or an uplink MAC-CE (or a high layer control message) on the PUSCH, or other traffic that may be classified by the DRX time management unit 550. The second trigger 1006 occurs at time t2, which is within the duration of the first inactivity timer 1004. In response to the second trigger 1006, the DRX time management unit 550 may be configured to cause the inactivity timer to fallback based on the nature of the communications. In an example, the second trigger 1006 may cause the inactivity timer to fallback to an original value. For example, the fallback value may be min(t1,t2) or max(t1,t2) based on the timer type (e.g., decreasing/increasing). In an example, the second duration T2 may be a second inactivity timer 1008 with a duration that may be more or less than the first inactivity timer 1004. For example, the second inactivity timer 1008 may be based on a value Δt 1010 (i.e., t2−t1) depicted in FIG. 10, and the DRX time management unit 550 may be configured to cause the inactivity timer to fallback to a value equal to t1+/−Δt based on the timer type (e.g., decreasing/increasing). In an example, the DRX time management unit 550 may not reset the first inactivity timer 1004, which will enable the inactivity timer to run to the end of the duration of the first inactivity timer 1004 (e.g., T1). In another example, the second trigger 1006 may cause the DRX time management unit 550 to stop the first inactivity timer and set the inactivity timer value to zero or a default value (i.e., based on whether the timer is an increasing or decreasing timer). The first and second triggers 1002, 1006 are examples, and not limitations. In operation, the times t1 and t2 may be based on the first symbol, last symbol, or the first symbol after the of PDSCH, and the first symbol, last symbol, or the first symbol after the of ACK of the PDSCH which carries MAC-CE, or combinations therein.

Referring to FIG. 11, an example data structure 1100 for trigger based inactivity timer values in a discontinuous reception cycle is shown. The data structure 1100 may be a data table with records comprising fields such as a trigger condition 1102 and an inactivity timer value 1104. The data structure 1100 may be a table in a relational database (e.g., SQL, Oracle, dBase, etc.) or in one or more flat files (e.g., XML, JSON, CSV, etc.). The data structure 1100 may persist in the memory 530 of the UE 500, or on a network resource such as the LMF 120 and may be provided to the UE 500 via network signaling (e.g., DCI, MAC-CE, RRC, or high layer messaging). The trigger conditions 1102 are a function of the traffic type, such as communications associated with the triggers 904, 1002, 1006, and the inactivity timer value 1104 is an inactivity timer 902, 1004, 1008 associated with the trigger condition 1102. The inactivity timer values 1104 may be set to any value, but are typically in a range from 0 msec to 2560 msecs. Other time values may also be used. In operation, the DRX time management unit 550 may be configured to query the data structure 1100 based on the trigger condition 1102 and determine the inactivity timer value 1104. The trigger conditions 1102 and the inactivity timer values 1104 are examples as additional traffic types (i.e., trigger conditions) and inactivity timer values may be used. As an example, the inactivity timer values 1104 are listed in the data structure 1100 in descending order. For example, the relationship between the inactivity timer values 1104 may be x1>=x2>=x3>=x4>=x5. In another example, the relative relationships may be such that x1=x2=x3>x4=x5=0. These relationships are examples, and not limitations. Other trigger conditions, inactivity timer values, and relationships may be used.

Referring to FIG. 12, a table 1200 of example trigger conditions for an inactivity timer in a discontinuous reception cycle is shown. The table 1200 is an example use case with Positioning Reference Signal (PRS), but other messaging may also be used. The UE 500 may be configured (statically and/or dynamically) to send an layer 1 and layer 2 (e.g., L1/L2) reports including positioning information based on various combinations of PRS configurations. For example, the PRS and reporting configurations may be periodic (P), semipersistent (SP), and asynchronous (A). As shown, with periodic DL-PRS and the UE 500 configured for periodic positioning reporting, there may be no dynamic trigger/activation of positioning reporting by the UE 500, and the positioning report may be provided by the UE 500 using the PUSCH (in layer 2). In this flow, the inactivity timer value 1104 may be 'x4', or 'x5' based on the PUSCH transmissions. With periodic DL-PRS and the UE 500 configured for semipersistent positioning reporting, the reporting may be DCI triggered via the PDCCH and the positioning report may be provided by the UE 500 using the PUSCH. Also, a MAC-CE trigger may be a PDSCH channel control signal which qualifies as 'x4,' and the report may be provided by the UE 500 using the PUSCH (on layer 1 or layer 2), which qualifies as 'x5' as an inactivity timer value 1104 (which may be zero or a nominal value) to suppress the inactivity timer. With periodic DL-PRS and the UE 500 configured for semipersistent positioning reporting, the reporting may be DCI triggered via the PDCCH and the report provided using PUSCH (on layer 1 or layer 2). If a DCI contains a trigger for a positioning report with a UL grant, the new UL transmission (e.g., a MAC-PDU) contains a PRS-related report. Then the inactivity timer value 1104 may be 'x5' (which may be zero or a nominal value) to suppress the inactivity timer. The UE 500 will not provide periodic positioning reporting if the DL-PRS is scheduled for semipersistent transmission and the UE 500 is configured for periodic positioning reporting. With semipersistent DL-PRS and the UE 500 configured for semipersistent positioning reporting, the reporting may be DCI triggered via the PDCCH and the report provided using PUSCH (on layer 1 or layer 2). Also, a MAC-CE may be used to activate semipersistent positioning reporting and the report may be provided by the UE 500 using the PUSCH. With the MAC-CE communication as a trigger condition, the inactivity timer value 1104 may be 'x5' (which may be zero or a nominal value) to suppress the inactivity timer. The 'x5' timer value 1104 could be used with the PUSCH with a control signal (e.g., UCI in PUSCH), or with the PUSCH with a one-time report (e.g., L1 report as UCI) or L2 report (i.e., MAC-CE). With semipersistent DL-PRS and the UE 500 configured for aperiodic positioning reporting, the reporting may be DCI triggered via the PDCCH and the report provided using PUSCH (on layer 1 or layer 2). If a DCI contains a trigger for a positioning report with a UL grant, the new UL transmission (e.g., a MAC-PDU) contains a PRS-related report. Then the inactivity timer value 1104 may be 'x5' (which may be a nominal value) to suppress the inactivity timer. The UE 500 will not provide positioning reporting if the DL-PRS is scheduled for aperiodic transmission and the UE 500 is configured for periodic or semipersistent positioning reporting. With aperiodic DL-PRS and the UE 500 configured for aperiodic positioning reporting, the reporting may be DCI triggered via the PDCCH and the report provided using PUSCH (on layer 1 or layer 2). If a DCI contains a trigger for a positioning report with a UL grant, the new UL transmission (e.g., a MAC-PDU) contains a PRS-related report. Then the inactivity timer value 1104 may be 'x5' (which may be a nominal value) to suppress the inactivity timer.

Figure 13:
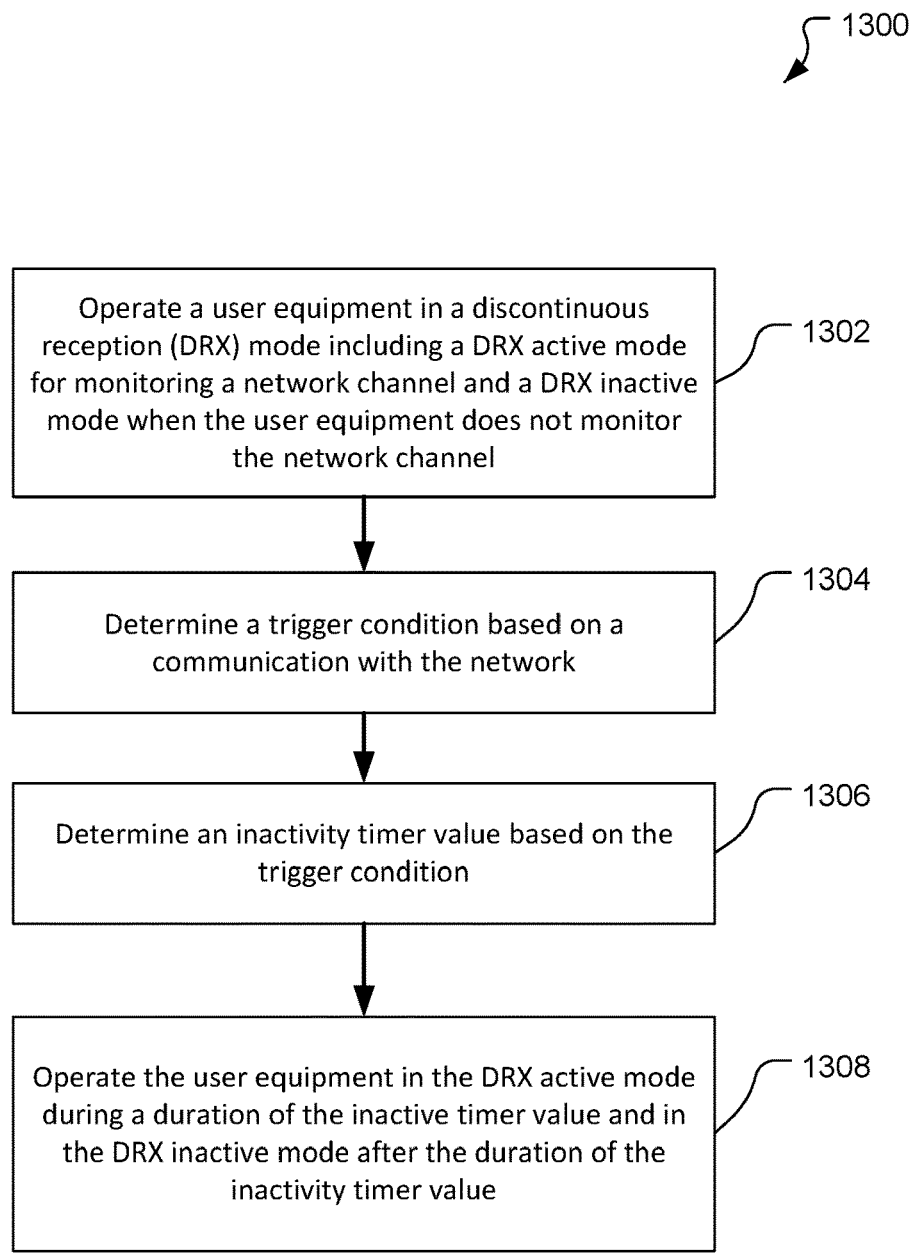
FIG. 13 is a block flow diagram of an example method of determining an inactivity timer value based on a trigger condition.

Referring to FIG. 13, with further reference to FIGS. 1-12, a method 1300 for operating a user equipment in a discontinuous reception (DRX) mode includes the stages shown. The method 1300 is an example, as stages may be added, rearranged, and/or removed.

At stage 1302, the method includes operating a user equipment in a discontinuous reception (DRX) mode including a DRX active mode for monitoring a network channel and a DRX inactive mode when the user equipment does not monitor the network channel. The UE 500 is a means for operating in a DRX mode. Referring to FIG. 6, the UE 500 is configured to operate in a DRX mode, with alternating active periods 608 (i.e., the DRX active mode) and inactive periods 610 (i.e., the DRX inactive mode). For example, during the active periods 608, the UE 500 may be configured to monitor the PDCCH and during the inactivity periods 610, the UE 500 does not monitor the PDCCH. The DRX mode may also include an inactivity timer 602 which may be started/re-started after communications with the network in an active period 608. The expiration of the inactivity timer 602 is one condition to enable the UE 500 to enter the DRX inactive mode. The UE 500 may enter the DRX inactive mode when the inactivity timer 602 expires and no other active timers are running (e.g., the DRX ON duration timer, the DRX retransmission timer, etc.). If other timers are running, the UE 500 may remain in the active mode after the inactivity timer 602 expires.

At stage 1304, the method includes determining a trigger condition based on a communication with the network. The UE 500 is a means for determining the trigger condition. During a DRX active period, the UE 500 may monitor the PDCCH for messaging, such as DCI messages (e.g., layer 1). The UE 500 may also be configured to provide uplink messages via the PUSCH during the DRX active period. The processor 510 may be configured to determine the trigger condition based on the nature of the communication traffic, and specifically, on the probability of exchanging additional data payloads. For example, a MAC-CE is typically a control signal and is not associated with an additional data payload. Referring to FIG. 11, as an example, the trigger conditions may include communications on the following channels with the indicated conditions: DL control messages on the PDCCH, DL messages on the PDSCH with data, UL messages on the PUSCH with data, DL control signals on the PDSCH, UL control signals on the PUSCH. In an example, a DL control signal may be a DL PAC-PDU containing one or more MAC-CEs. The trigger conditions may be further based on additional factors, such as whether a MAC-CE contains an UL grant request.

At stage 1306, the method includes determining an inactivity timer value based on the trigger condition. The UE 500 is a means for determining the inactivity timer value. The network may provide an inactivity timer information element in a configuration message (e.g., via RRC messaging), and the processor 510 may be configured to utilize the received inactivity timer information as a default inactivity timer value 602. In an embodiment, the processor 510 may utilize the default inactivity timer value for some trigger conditions, and a zero (or nominal value) for other trigger conditions. For example, DL control messages on the PDCCH, DL messages on the PDSCH with data, and UL messages on the PUSCH with data may utilize the default inactivity timer value. DL control signals on the PDSCH and UL control signals on the PUSCH may utilize a zero or nominal value for the inactivity timer duration. MAC-CE commands with UL grant requests may be treated as a new PUSCH with a new data trigger (i.e., utilize the default inactivity timer value). In another embodiment, the processor 510 may be configured to determine inactivity timer values based on a data structure, such as the data structure 1100. The data structure may be received from the network via RRC, LPP, or other network signaling. The processor 510 may be configured to select an inactivity timer value 1104 based on the trigger condition 1102.

At stage 1308, the method includes operating the user equipment in the DRX active mode during a duration of the inactivity timer value and in the DRX inactive mode after the duration of the inactivity timer value. The UE 500 is a means for operating in the DRX active and DRX inactive modes. Referring to FIG. 9, as an example, the UE 500 is configured to monitor the PDCCH (i.e., remain in DRX active mode) through the duration of the inactivity timer 902 (i.e., as determined at stage 1306). In an example, the duration of the inactivity timer 902 may be zero (or a nominal value) and the UE 500 may enter the DRX inactive mode (i.e., will not monitor the PDCCH) until the next scheduled DRX active mode. In an embodiment, referring to FIG. 10, during the inactivity timer period the UE 500 may send or receive data to/from the network which may be evaluated as the second trigger 1006. The processor 510 may be configured to evaluate the second trigger and apply a fallback condition. In an example, the fallback design may be to restart the inactivity timer based on the second trigger 1006. Another example fallback design may include allowing the original inactivity timer (i.e., the first inactivity timer 1004) to expire as scheduled. Another example fallback design may be to cancel the inactivity timer and enter the DRX inactive mode after the second trigger is evaluated. Another example fallback design may be to set the inactivity timer back an amount of time (i.e., a fallback time) which will cause the UE to remain in the DRX active mode for an amount of time equal to the time remaining on the original inactivity timer plus the fallback time. For example, the fallback timer may be a time period equal to t1 Δt based on the type of timer (e.g., decreasing/increasing). The fallback time may be based on the nature of the second trigger 1006 such that a PDCCH signal will have a larger fallback time than a PDSCH with new data, and a PUSCH with new data, etc. as described with the inactivity timer values above. In an example, the data structure 1100 may include a new field indicating a fallback time for each of the trigger conditions 1102. In an embodiment, the expiration of the inactivity timer 602 is a required but not a singularly sufficient condition to enable the UE 500 to enter the DRX inactive mode. Other timers, such as a DRX ON duration timer and a DRX retransmission timer may delay the UE 500 from entering an inactive period 610.

Figure 14:
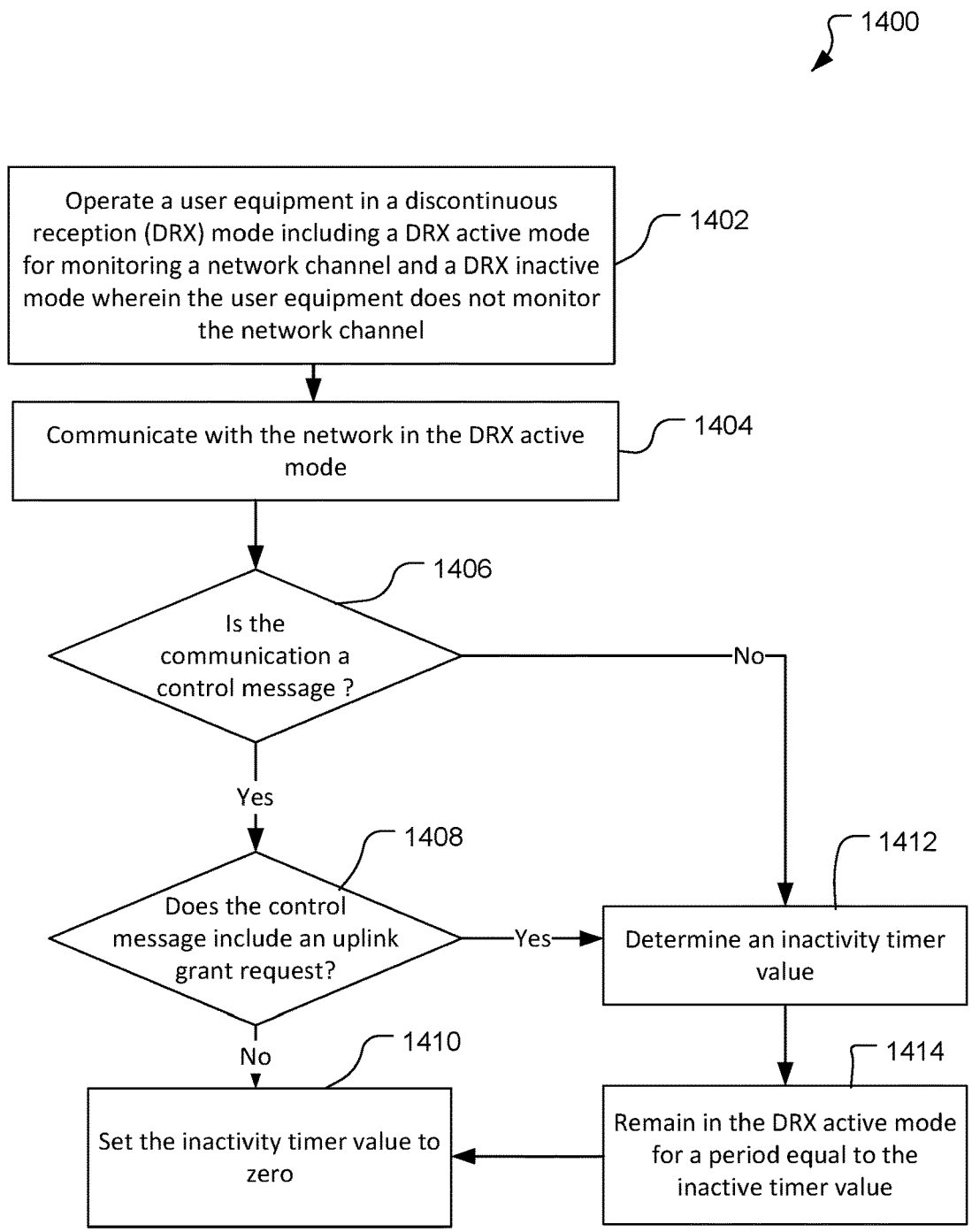
FIG. 14 is a block flow diagram of an example method of operating a user equipment in a discontinuous reception mode.

Referring to FIG. 14, with further reference to FIGS. 1-12, a method 1400 of operating a user equipment in a discontinuous reception mode includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes operating a user equipment in a discontinuous reception (DRX) mode including a DRX active mode for monitoring a network channel and a DRX inactive mode wherein the user equipment does not monitor the network channel. The UE 500 is a means for operating in a DRX mode. Referring to FIG. 6, the UE 500 is configured to operate in a DRX mode, with alternating active periods 608 (i.e., the DRX active mode) and inactive periods 610 (i.e., the DRX inactive mode). The DRX mode may also include an inactivity timer 602 which may be started/re-started after communications with the network in an active period 608. The expiration of the inactivity timer 602 is one condition to enable the UE 500 to enter the DRX inactive mode. The UE 500 may enter the DRX inactive mode when the inactivity timer 602 expires and no other active timers are running (e.g., the DRX ON duration timer, the DRX retransmission timer, etc.). If other timers are running, the UE 500 may remain in the active mode after the inactivity timer 602 expires.

At stage 1404, the method includes communicating with the network in the DRX active mode. The UE 500 is a means for communicating with the network. The UE 500 is configured to monitor the PDCCH during the active periods and may also receive and send data on other UL and DL channels while in the DRX active mode. For example, the communications may include DL control messages on the PDCCH, DL messages on the PDSCH with data, UL messages on the PUSCH with data, DL control signals on the PDSCH, UL control signals on the PUSCH. Other UL communications such as UL grant requests and BSR reports may occur in the DRX active mode.

At stage 1406, the method includes determining if the communication is a control message. The processor 510 is a means for determining if a communication is a control message. In an example, the UE 500 may send and receive control messages with the network. The control messages may be layer 2 or layer 3 messages such as MAC-CE or higher layer control messages (e.g., RRC, LPP) on the PDSCH and the PUSCH. In general, a control message is a single transmission event and does not depend on additional data payloads (e.g., follow-on messaging). There are some exceptions, however, and at stage 1408, the processor 510 may be configured to determine if the control message includes an uplink grant request. For example, a MAC Random Access Request (MAC RAR) may include an UL grant. A MAC-PDU may include a MAC-CE and a MAC-SDU at the same time and thus may not be considered as a control message. Other layer 2 and layer 3 messages may be associated with follow-on reports, which the processor 510 may use as a basis for determining an inactivity timer value. At stage 1410, the method includes setting the duration of an inactivity timer value to zero if the control message does not include an uplink grant request. In an example, the UE 500 may transition to the DRX inactive mode (i.e., and not monitor the PDCCH) when the control message is decoded and determined not to require additional messaging or reporting.

At stage 1412, the method includes determining an inactivity timer value. The processor 510 is a means for determining an inactivity timer value. In an embodiment, if the communication is not a control message, the processor 510 may be configured to assign a default inactivity timer value based on a network configuration, or another previously stored value. In an embodiment, the processor 510 may determine an inactivity timer value with more granularity, such as with the data structure 110. That is, the communication or uplink grant may be evaluated as a trigger condition 1102 and the processor 510 is configured to select a corresponding inactivity timer value 1104. At stage 1414, the method includes remaining in the DRX active mode for a period equal to the inactivity timer value. In an example, the inactivity timer value may be a non-zero value (e.g., in a range of 1-2560 msec). While in the active mode, the UE 500 may monitor the PDCCH for additional traffic. When the inactivity timer expires, the UE 500 may switch to the inactive mode at stage 1410.

Figure 15:
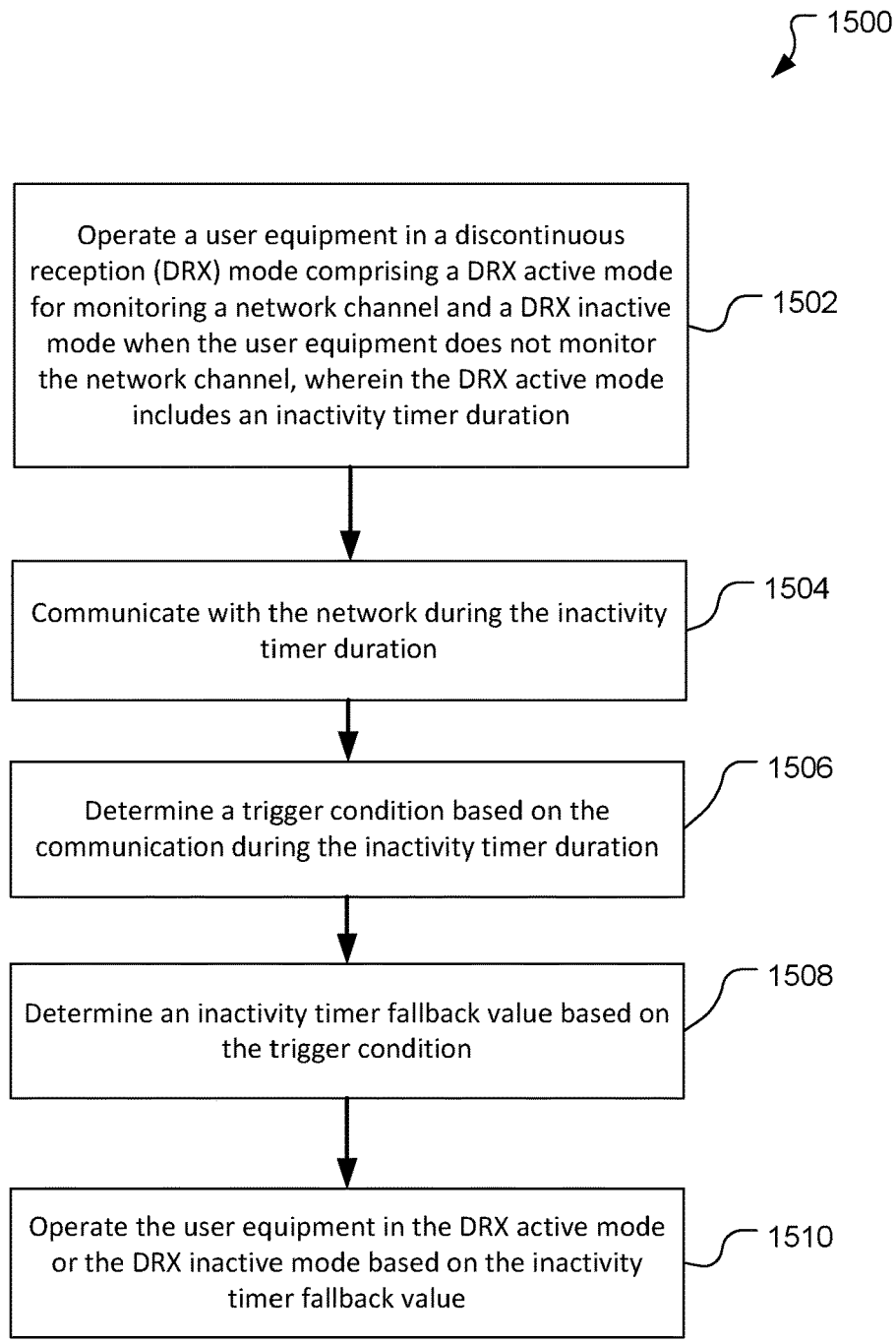
FIG. 15 is a block flow diagram of an example method of determining an inactivity timer fallback value based on a trigger condition.

Referring to FIG. 15, with further reference to FIGS. 1-14, a method 1500 of operating a user equipment in a discontinuous reception (DRX) mode includes the stages shown. The method 1500 is, however, an example and not limiting. The method 1500 may be altered, e.g., by having stages added and/or having a single stage split into multiple stages.

At stage 1502, the method includes operating a user equipment in a discontinuous reception (DRX) mode comprising a DRX active mode for monitoring a network channel and a DRX inactive mode when the user equipment does not monitor the network channel, wherein the DRX active mode includes an inactivity timer duration. The UE 500 is a means for operating in a DRX mode. Referring to FIG. 6, the UE 500 is configured to operate in a DRX mode, with alternating active periods 608 (i.e., the DRX active mode) and inactive periods 610 (i.e., the DRX inactive mode). The DRX mode also includes an inactivity timer 602 which may be started/re-started after communications with the network in an active period 608. The expiration of the inactivity timer 602 is one condition to enable the UE 500 to enter the DRX inactive mode. The UE 500 may enter the DRX inactive mode when the inactivity timer 602 expires and no other active timers are running (e.g., the DRX ON duration timer, the DRX retransmission timer, etc.). If other timers are running, the UE 500 may remain in the active mode after the inactivity timer 602 expires.

At stage 1504, the method includes communicating with the network during the inactivity timer duration. The UE 500 is a means for communicating with the network. In an example, referring to FIG. 10, the UE 500 may be configured to remain in an active state for a duration of the first inactivity timer 1004. A subsequent communication may occur at time t2, which within the duration of the first inactivity timer 1004. The communication may be, for example, a new DL PDCCH, a new DL MAC-CE on the PDSCH, or an UL MAC-CE (or high layer control message) on the PUSCH.

At stage 1506, the method includes determining a trigger condition based on the communication during the inactivity timer duration. The UE 500 is a means for determining the trigger condition. During the inactivity timer period, the UE 500 is in the active mode and may monitor the PDCCH for messaging (e.g., DCI). The DCI may indicate other DL transmissions, such as MAC-CE or higher layer messaging. The UE 500 may also be configured to provide uplink messages via the PUSCH. The processor 510 may be configured to determine the trigger condition based on the nature of the communication, and specifically, on the probability of exchanging additional data payloads. For example, a MAC-CE is typically a control signal and is not associated with an additional data payload. Referring to FIG. 11, as an example, the trigger conditions may include communications on the following channels with the indicated conditions: DL messages on the PDCCH, DL messages on the PDSCH with data, UL messages on the PUSCH with data, DL control signals on the PDSCH, UL control signals on the PUSCH. The trigger conditions may be further based on additional factors, such as whether an MAC-CE contains an UL grant request.

At stage 1508, the method includes determining an inactivity timer fallback value based on the trigger condition. The processor 510 is a means for determining an inactivity timer fallback value. In an example, referring to FIG. 10, the fallback value may be configured to restart the inactivity timer based on the second trigger 1006. In an example, the second trigger 1006 may cause the inactivity timer to fallback to an original value. For example, the fallback value may be min(t1,t2) or max(t1,t2) based on the timer type (e.g., decreasing/increasing). The fallback value may be configured to cancel the first inactivity timer 1004 and reset the inactivity timer (i.e., put the timer in the inactive mode). The fallback value may be configured to set the inactivity timer back an amount of time which will cause the UE 500 to remain in the DRX active mode for an amount of time equal to the time remaining on the original inactivity timer plus the fallback value. For example, the inactivity timer value may fallback a value equal to t1+/−Δt based on the timer type (e.g., decreasing/increasing). The fallback value may be based on the nature of the traffic associated with the second trigger 1006 such that a PDCCH signal will have a larger fallback value than a PDSCH with new data, and a PUSCH with new data, etc. as described with the inactivity timer values above. In an example, the data structure 1100 may include a new field indicating a fallback value for each of the trigger conditions 1102.

At stage 1510, the method includes operating the user equipment in the DRX active mode or the DRX inactive mode based on the inactivity timer fallback value. The UE 500 is a means for operating in the active and inactive modes. The fallback value determined at stage 1508 may be used to modify the current inactivity timer, which may result in appending or truncating the duration of the DRX active mode operation. Thus, while the inactivity timer is active, the UE 500 will remain in the DRX active mode. When the inactivity timer expires, the DRX time management unit 550 is configured to set the inactivity timer value to zero or a default value (e.g., based on whether the inactivity timer is an increasing or decreasing timer) and the UE 500 will enter the DRX inactive mode (i.e., and not monitor the network channel). In an embodiment, the expiration of the inactivity timer 602 is a required but not a singularly sufficient condition to enable the UE 500 to enter the DRX inactive mode. Other timers, such as a DRX ON duration timer and a DRX retransmission timer may delay the UE 500 from entering an inactive period 610.

Figure 16:
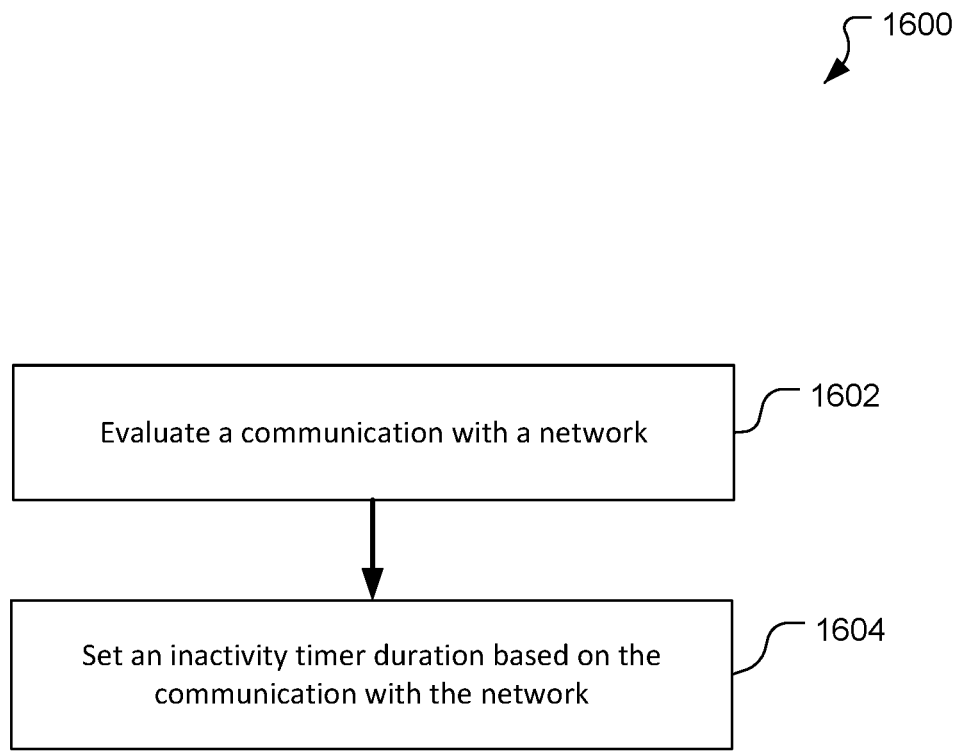
FIG. 16 is a block flow diagram of an example method for configuration a discontinuous reception mode in a mobile device.

Referring to FIG. 16, with further reference to FIGS. 1-12, a method 1600 for configuration a discontinuous reception (DRX) mode in a mobile device includes the stages shown. The method 1600 is an example, as stages may be added, rearranged, and/or removed.

At stage 1602, the method includes evaluating a communication with a network. The DRX time management unit 550 is a means for evaluating the communication with the network. In an example, during a DRX active period, a UE 500 may monitor the PDCCH for messaging, such as DCI messages (e.g., layer 1). The UE 500 may also be configured to provide uplink messages via the PUSCH during the DRX active period. The processor 510 may be configured to evaluate these communications based on the nature of the communication traffic, and specifically, on the probability of exchanging additional data payloads. For example, a MAC-CE is typically a control signal and is not associated with an additional data payload. Other examples of communications include DL control messages on the PDCCH, DL messages on the PDSCH with data, UL messages on the PUSCH with data, DL control signals on the PDSCH, UL control signals on the PUSCH. In an example, a DL control signal may be a DL MAC-PDU containing one or more MAC-CEs. The evaluation of the communications may be further based on additional factors, such as whether a MAC-CE contains an UL grant request.

At stage 1604, the method includes setting an inactivity timer duration based on the communication with the network. The DRX time management unit 550 is a means for setting the inactivity timer duration. In an example, the network may provide an inactivity timer information element in a configuration message (e.g., via RRC messaging), and the processor 510 may be configured to utilize the received inactivity timer information as a default duration of the inactivity timer value 602. The processor 510 may be configured to utilize the default inactivity timer duration for some communications, and a duration of zero (or a nominal value) for other communications. For example, DL control messages on the PDCCH, DL messages on the PDSCH with data, and UL messages on the PUSCH with data may utilize the default inactivity timer duration. DL control signals on the PDSCH and UL control signals on the PUSCH may utilize a zero or nominal value for the inactivity timer duration. MAC-CE commands with UL grant requests may be treated as a new PUSCH with a new data trigger (i.e., utilize the default inactivity timer duration). In another embodiment, the processor 510 may be configured to determine inactivity timer durations based on a data structure, such as the data structure 1100. The data structure may be received from the network via RRC, LPP, or other network signaling. The processor 510 may be configured to select an inactivity timer value 1104 based on the trigger condition 1102.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method of configuring a discontinuous reception (DRX) mode in a mobile device, comprising:
evaluating a communication with a network; and
setting an inactivity timer duration based on the communication with the network.

2. The method of clause 1 wherein the communication with the network is received via a Physical Downlink Control Channel (PDCCH).

3. The method of clause 1 wherein the communication with the network is received via a Physical Downlink Shared Channel (PDSCH).

4. The method of clause 3 wherein the communication with the network comprises a Medium Access Control Control Element (MAC-CE) message, or may include only a MAC-CE message.

5. The method of clause 1 wherein the communication with the network is transmitted via a Physical Uplink Shared Channel (PUSCH).

6. The method of clause 5 wherein the communication with the network is a Medium Access Control Control Element (MAC-CE) message.

7. The method of clause 6 wherein the MAC-CE message includes an uplink grant request.

8. The method of clause 1 further comprising:
evaluating a second communication with the network, wherein the second communication occurs during the inactivity timer duration; and
setting the inactivity timer duration based on the second communication with the network.

9. A method for operating a user equipment in a discontinuous reception (DRX) mode, comprising:
operating the user equipment in the discontinuous reception (DRX) mode including a DRX active mode for monitoring a network channel and a DRX inactive mode when the user equipment does not monitor the network channel;
determining a trigger condition based on a communication with a network;
determining an inactivity timer value based on the trigger condition; and
operating the user equipment in the DRX active mode during a duration of the inactivity timer value and in the DRX inactive mode after the duration of the inactivity timer value.

10. The method of clause 9 wherein the communication with the network is received via a Physical Downlink Control Channel (PDCCH) and the inactivity timer value is a non-zero value (e.g., in a range from 1 to 2560 milliseconds).

11. The method of clause 9 wherein the communication with the network is received via a Physical Downlink Shared Channel (PDSCH) and the inactivity timer value is a non-zero value.

12. The method of clause 11 wherein the communication with the network is a Medium Access Control Control Element (MAC-CE) message and the inactivity timer value is any value including zero (e.g., in a range from 0 to 2560 milliseconds).

13. The method of clause 9 wherein the communication with the network is transmitted via a Physical Uplink Shared Channel (PUSCH) and the inactivity timer value is a non-zero value.

14. The method of clause 13 wherein the communication with the network is a Medium Access Control Control Element (MAC-CE) message and the inactivity timer value is any value including zero.

15. The method of clause 14 wherein the MAC-CE message includes an uplink grant request and the inactivity timer value is a non-zero value.

16. The method of clause 9 wherein determining the inactivity timer value based on the trigger condition includes querying a data structure based on the trigger condition.

17. The method of clause 9 further comprising:
communicating with the network during the duration of the inactivity timer value;
determining a second trigger condition based on the communication during the duration of the inactivity timer value; and
modifying the inactivity timer value based on the second trigger condition.

18. A method for operating a user equipment in a discontinuous reception (DRX) mode, comprising:
operating the user equipment in the discontinuous reception (DRX) mode comprising a DRX active mode for monitoring a network channel and a DRX inactive mode when the user equipment does not monitor the network channel, wherein the DRX active mode includes an inactivity timer duration;
communicating with the network during the inactivity timer duration;
determining a trigger condition based on a communication during the inactivity timer duration;
determining an inactivity timer fallback value based on the trigger condition; and
operating the user equipment in the DRX active mode or the DRX inactive mode based on the inactivity timer fallback value.

19. The method of clause 18 wherein the communication with the network is received via a Physical Downlink Control Channel (PDCCH).

20. The method of clause 18 wherein the communication with the network is received via a Physical Downlink Shared Channel (PDSCH).

21. The method of clause 20 wherein the communication with the network is a Medium Access Control Control Element (MAC-CE) message.

22. The method of clause 18 wherein the communication with the network is transmitted via a Physical Uplink Shared Channel (PUSCH).

23. The method of clause 22 wherein the communication with the network is a Medium Access Control Control Element (MAC-CE) message.

24. The method of clause 23 wherein the MAC-CE message includes an uplink grant request.

25. The method of clause 18 wherein determining the inactivity timer fallback value based on the trigger condition includes querying a data structure based on the trigger condition.

26. An apparatus configured for operating in a discontinuous reception (DRX) mode, comprising:
a memory;
at least one transceiver;
at least one processor communicatively coupled to the memory and the at least one transceiver and configured to:
evaluate a communication with a network; and
set an inactivity timer duration based on the communication with the network.

27. The apparatus of clause 26 wherein the communication with the network is received via a Physical Downlink Control Channel (PDCCH).

28. The apparatus of clause 26 wherein the communication with the network is received via a Physical Downlink Shared Channel (PDSCH).

29. The apparatus of clause 28 wherein the communication with the network is a Medium Access Control Control Element (MAC-CE) message.

30. The apparatus of clause 26 wherein the communication with the network is transmitted via a Physical Uplink Shared Channel (PUSCH).

31. The apparatus of clause 30 wherein the communication with the network is a Medium Access Control Control Element (MAC-CE) message.

32. The apparatus of clause 31 wherein the MAC-CE message includes an uplink grant request.

33. The apparatus of clause 26 further comprising:
evaluating a second communication with the network, wherein the second communication occurs during the inactivity timer duration; and
setting the inactivity timer duration based on the second communication with the network.

34. An apparatus, comprising:
a memory;
at least one transceiver;
at least one processor communicatively coupled to the memory and the at least one transceiver and configured to:
operate the apparatus in a discontinuous reception (DRX) mode including a DRX active mode for monitoring a network channel and a DRX inactive mode when the apparatus does not monitor the network channel;
determine a trigger condition based on a communication with a network;
determine an inactivity timer value based on the trigger condition; and
operate the apparatus in the DRX active mode during a duration of the inactivity timer value and in the DRX inactive mode after the duration of the inactivity timer value.

35. The apparatus of clause 34 wherein the communication with the network is received via a Physical Downlink Control Channel (PDCCH) and the inactivity timer value is a non-zero value (e.g., in a range from 1 to 2560 milliseconds).

36. The apparatus of clause 34 wherein the communication with the network is received via a Physical Downlink Shared Channel (PDSCH) and the inactivity timer value is a non-zero value.

37. The apparatus of clause 36 wherein the communication with the network is a Medium Access Control Control Element (MAC-CE) message and the inactivity timer value is any value including zero (e.g., in a range from 0 to 2560 milliseconds).

38. The apparatus of clause 34 wherein the communication with the network is transmitted via a Physical Uplink Shared Channel (PUSCH) and the inactivity timer value is a non-zero value.

39. The apparatus of clause 38 wherein the communication with the network is a Medium Access Control Control Element (MAC-CE) message and the inactivity timer value is any value including zero.

40. The apparatus of clause 39 wherein the MAC-CE message includes an uplink grant request and the inactivity timer value is a non-zero value.

41. The apparatus of clause 34 wherein the at least one processor is further configured to query a data structure based on the trigger condition.

42. The apparatus of clause 34 wherein the at least one processor is further configured to:
communicate with the network during the duration of the inactivity timer value;
determine a second trigger condition based on the communication during the duration of the inactivity timer value; and
modify the inactivity timer value based on the second trigger condition.

43. An apparatus, comprising:
a memory;
at least one transceiver;
at least one processor communicatively coupled to the memory and the at least one transceiver and configured to:
operate the apparatus in a discontinuous reception (DRX) mode including a DRX active mode for communicating with a network and a DRX inactive mode when the apparatus does not communicate with the network, wherein the DRX active mode includes an inactivity timer duration;
communicate with the network during the inactivity timer duration;
determine a trigger condition based on a communication during the inactivity timer duration;
determine an inactivity timer fallback value based on the trigger condition; and
operate the apparatus in the DRX active mode or the DRX inactive mode based on the inactivity timer fallback value.

44. The apparatus of clause 43 wherein the communication with the network is received via a Physical Downlink Control Channel (PDCCH).

45. The apparatus of clause 43 wherein the communication with the network is received via a Physical Downlink Shared Channel (PDSCH).

46. The apparatus of clause 45 wherein the communication with the network is a Medium Access Control Control Element (MAC-CE) message.

47. The apparatus of clause 43 wherein the communication with the network is transmitted via a Physical Uplink Shared Channel (PUSCH).

48. The apparatus of clause 47 wherein the communication with the network is a Medium Access Control Control Element (MAC-CE) message.

49. The apparatus of clause 48 wherein the MAC-CE message includes an uplink grant request.

50. The apparatus of clause 43 wherein the at least one processor is further configured to query a data structure based on the trigger condition.

51. An apparatus, comprising:
means for evaluating a communication with a network; and
means for setting an inactivity timer duration based on the communication with the network.

52. An apparatus for operating in a discontinuous reception (DRX) mode, comprising:
means for operating the user equipment in the discontinuous reception (DRX) mode including a DRX active mode for monitoring a network channel and a DRX inactive mode when the user equipment does not monitor the network channel;
means for determining a trigger condition based on a communication with a network;
means for determining an inactivity timer value based on the trigger condition; and
means for operating the apparatus in the DRX active mode during a duration of the inactivity timer value and in the DRX inactive mode after the duration of the inactivity timer value.

53. An apparatus for operating a in a discontinuous reception (DRX) mode, comprising:
means for operating the user equipment in the discontinuous reception (DRX) mode comprising a DRX active mode for monitoring a network channel and a DRX inactive mode when the user equipment does not monitor the network channel, wherein the DRX active mode includes an inactivity timer duration;
means for communicating with the network during the inactivity timer duration;
means for determining a trigger condition based on a communication during the inactivity timer duration;
means for determining an inactivity timer fallback value based on the trigger condition; and
means for operating the apparatus in the DRX active mode or the DRX inactive mode based on the inactivity timer fallback value.

54. A non-transitory processor-readable storage medium comprising processor-readable instructions configured to cause one or more processors to configure a discontinuous reception (DRX) mode in a mobile device, comprising:
code for evaluating a communication with a network; and
code for setting an inactivity timer duration based on the communication with the network.

55. A non-transitory processor-readable storage medium comprising processor-readable instructions configured to cause one or more processors operate a user equipment in a discontinuous reception (DRX) mode, comprising:
code for operating the user equipment in the discontinuous reception (DRX) mode including a DRX active mode for monitoring a network channel and a DRX inactive mode when the user equipment does not monitor the network channel;
code for determining a trigger condition based on a communication with a network;
code for determining an inactivity timer value based on the trigger condition; and
code for operating the user equipment in the DRX active mode during a duration of the inactivity timer value and in the DRX inactive mode after the duration of the inactivity timer value.

56. A non-transitory processor-readable storage medium comprising processor-readable instructions configured to cause one or more processors to operate a user equipment in a discontinuous reception (DRX) mode, comprising:
code for operating the user equipment in the discontinuous reception (DRX) mode comprising a DRX active mode for monitoring a network channel and a DRX inactive mode when the user equipment does not monitor the network channel, wherein the DRX active mode includes an inactivity timer duration;
code for communicating with the network during the inactivity timer duration;
code for determining a trigger condition based on a communication during the inactivity timer duration;
code for determining an inactivity timer fallback value based on the trigger condition; and
code for operating the user equipment in the DRX active mode or the DRX inactive mode based on the inactivity timer fallback value.

The invention claimed is:

1. A method for operating a user equipment in a discontinuous reception (DRX) mode, comprising:
operating the user equipment in the discontinuous reception (DRX) mode including a DRX active mode for monitoring a network channel and a DRX inactive mode when the user equipment does not monitor the network channel, wherein the DRX active mode includes an inactivity timer;
detecting a first trigger condition for the inactivity timer based on a first communication with a network, wherein the first communication is one of a predefined type of communication with the network;
determining a first inactivity timer value based on the first trigger condition; and
operating the user equipment in the DRX active mode during a duration of the first inactivity timer value;
detecting a second trigger condition based on a second communication with the network, wherein the second communication occurs within the duration of the first inactivity timer value;
determining a delta time value based at least in part on a time duration between detecting the first trigger condition and detecting the second trigger condition;
determining a second inactivity timer value based at least in part on the delta time value; and
operating the user equipment in the DRX active mode during a duration of the second inactivity timer value.

2. The method of claim 1 wherein the second inactivity timer value is a non-zero value.

3. An apparatus, comprising:
a memory;
at least one transceiver;
at least one processor communicatively coupled to the memory and the at least one transceiver and configured to:
operate the apparatus in a discontinuous reception (DRX) mode including a DRX active mode for monitoring a network channel and a DRX inactive mode when the apparatus does not monitor the network channel, wherein the DRX active mode includes an inactivity timer;
detect a first trigger condition for the inactivity timer based on a first communication with a network, wherein the first communication is one of a predefined type of communication with the network;
determine a first inactivity timer value based on the first trigger condition; and
operate the apparatus in the DRX active mode during a duration of the first inactivity timer value;
detect a second trigger condition based on a second communication with the network, wherein the second communication occurs within the duration of the first inactivity timer value;
determine a delta time value based at least in part on a time duration between detecting the first trigger condition and detecting the second trigger condition;
determine a second inactivity timer value based at least in part on the delta time value; and
operate the user equipment in the DRX active mode during a duration of the second inactivity timer value.

4. The apparatus of claim 3 wherein the second inactivity timer value is in a non-zero value.

* * * * *